US010891877B2

(12) United States Patent
Li et al.

(10) Patent No.: US 10,891,877 B2
(45) Date of Patent: Jan. 12, 2021

(54) METHODS AND APPARATUS FOR SECURING SOUNDING SYMBOLS

(71) Applicant: Intel Corporation, Santa Clara, CA (US)

(72) Inventors: Qinghua Li, San Ramon, CA (US); Yuan Zhu, Beijing (CN); Jonathan Segev, Tel Mond (IL); Robert Stacey, Portland, OR (US); Xiaogang Chen, Portland, OR (US); Feng Jiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 15/998,726

(22) Filed: Aug. 15, 2018

(65) Prior Publication Data

US 2019/0043388 A1  Feb. 7, 2019

Related U.S. Application Data

(60) Provisional application No. 62/545,835, filed on Aug. 15, 2017, provisional application No. 62/545,860, filed on Aug. 15, 2017, provisional application No. 62/545,838, filed on Aug. 15, 2017.

(51) Int. Cl.
| *H04L 9/06* | (2006.01) |
| *G09C 1/00* | (2006.01) |
| *H04W 12/04* | (2009.01) |
| *H04L 9/08* | (2006.01) |
| *H04L 29/06* | (2006.01) |
| *H04W 12/02* | (2009.01) |
| *H04W 84/12* | (2009.01) |

(52) U.S. Cl.
CPC .............. *G09C 1/00* (2013.01); *H04L 9/0618* (2013.01); *H04L 9/0869* (2013.01); *H04L 9/0891* (2013.01); *H04L 63/0428* (2013.01); *H04L 63/061* (2013.01); *H04W 12/02* (2013.01); *H04W 12/04* (2013.01); *H04L 2209/80* (2013.01); *H04W 84/12* (2013.01)

(58) Field of Classification Search
None
See application file for complete search history.

(56) References Cited

U.S. PATENT DOCUMENTS

| 2002/0003773 | A1* | 1/2002 | Okada ...................... H04L 5/06 370/208 |
| 2002/0034214 | A1* | 3/2002 | Okada ..................... H04L 5/023 375/147 |
| 2002/0122499 | A1* | 9/2002 | Kannan ................. H04L 5/0044 375/260 |
| 2005/0055546 | A1* | 3/2005 | Dzung ................ H04L 27/2647 713/151 |
| 2005/0111538 | A1* | 5/2005 | Wernaers ............ H04L 25/0216 375/229 |

(Continued)

*Primary Examiner* — William J. Goodchild
(74) *Attorney, Agent, or Firm* — Hanley, Flight & Zimmerman, LLC

(57) ABSTRACT

Methods, apparatus, and articles of manufacture to secure sounding symbols are described herein. An example apparatus includes a cipher to generate a bit value based on a common key and a seed value; a frame generator to generate a sounding signal based on the bit value; and an interface to instruct radio architecture to transmit the sounding signal.

20 Claims, 16 Drawing Sheets

(56) References Cited

U.S. PATENT DOCUMENTS

| | | | |
|---|---|---|---|
| 2006/0085644 A1* | 4/2006 | Isozaki | H04L 9/0844 713/171 |
| 2006/0155997 A1* | 7/2006 | Fritzges | H04L 63/0428 713/171 |
| 2006/0179433 A1* | 8/2006 | Fair | H04L 67/08 717/174 |
| 2009/0245516 A1* | 10/2009 | Ravikiran | H04L 9/0869 380/268 |
| 2016/0294515 A1* | 10/2016 | Wentink | H04L 5/005 |
| 2016/0330000 A1* | 11/2016 | Lee | H04W 72/0406 |

* cited by examiner

US 10,891,877 B2

METHODS AND APPARATUS FOR SECURING SOUNDING SYMBOLS

RELATED APPLICATION

This patent arises from an application claiming the benefit of U.S. Provisional Patent Application Ser. No. 62/545,835, which was filed on Aug. 15, 2017, U.S. Provisional Patent Application Ser. No. 62/545,838, which was filed on Aug. 15, 2017, and U.S. Provisional Patent Application Ser. No. 62/545,860, which was filed on Aug. 15, 2017. U.S. Provisional Patent Application Ser. No. 62/545,835, U.S. Provisional Patent Application Ser. No. 62/545,838, and U.S. Provisional Patent Application Ser. No. 62/545,860 are hereby incorporated herein by reference in its entirety. Priority to U.S. Provisional Patent Application Ser. No. 62/545,835, U.S. Provisional Patent Application Ser. No. 62/545,838, and U.S. Provisional Patent Application Ser. No. 62/545,860 are hereby claimed.

FIELD OF THE DISCLOSURE

This disclosure relates generally to wireless fidelity connectivity (Wi-Fi) and, more particularly, to methods and apparatus for securing sounding symbols.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
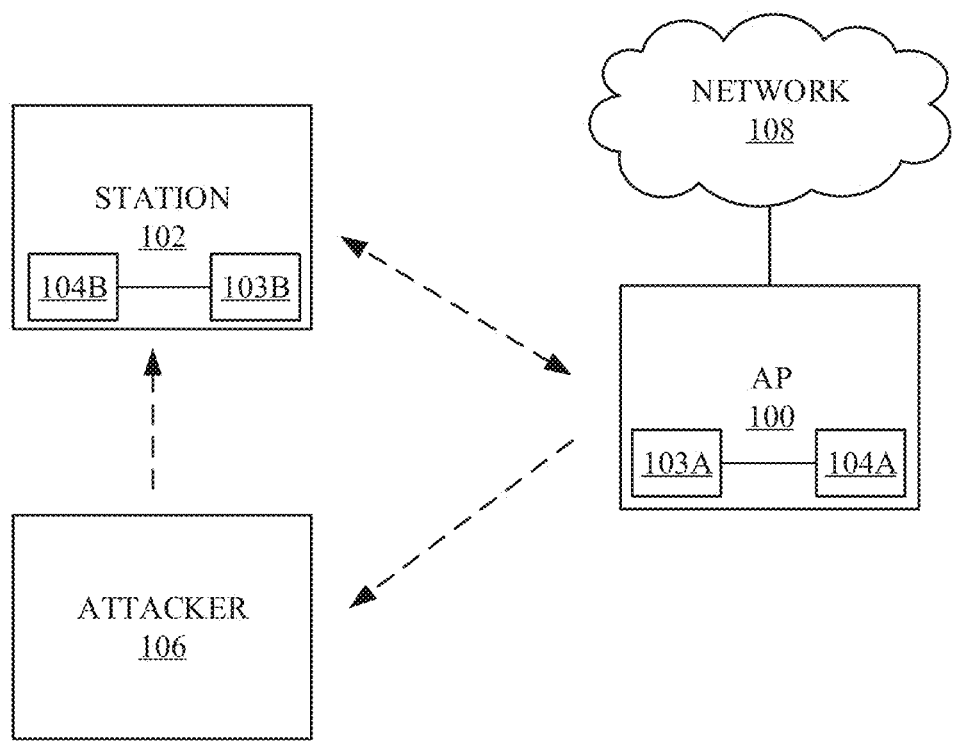
FIG. 1 is an illustration of the transmission of secure sounding symbols using Wi-Fi protocols between example access point and an example station.

Various locations (e.g., homes, offices, coffee shops, restaurants, parks, airports, etc.) may provide Wi-Fi to the Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled device within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol for how the AP communicates with the devices to provide access to the Internet by transmitting uplink (UL) transmissions and receiving downlink (DL) transmissions to/from the Internet.

In some examples, wireless devices (e.g., a Wi-Fi AP and a connected station) communicate using sounding signals. For example, if the Wi-Fi AP is structured to communicate using 802.11ax or 802.11ac protocols, the sounding signal is an orthogonal frequency-division multiple access (OFDM) symbol structure. The OFDM frame includes one or more tones to be communicated over a frequency channel. The OFDM frame may be a downlink or an uplink frame and includes data and/or null tones (e.g., including guard tones and/or DC tones). A guard tone is a null tone (e.g., zero energy) that prevents overlapping of OFDM symbols and reduces inter-symbol interference (ISI).

Some Wi-Fi protocols perform sounding protocols that correspond to repetitive patterns. In some Wi-Fi protocols, a sounding protocol/measurement is performed multiple times. In such examples, the sounding signal that is transmitted during the multiple sounding measurements may be the same (e.g., repeated). In some Wi-Fi protocols, a sounding signal may be repeated during a sounding measurement (e.g., during sounding of multiple antennas). Some Wi-Fi protocols mandate that sounding signals (e.g., OFDM signals) end a transmission of signals by replaying the non-zero cyclic prefix (CP) signals. The CP is one or more of the first signals of the sounding signal that is repeated at the end of the sounding signal. In this manner, when a STA receives a sounding signal and determines that the signal transmission has ended when the last signal(s) match the initial signal(s). For example, if a communication protocol corresponds to a CP that is the first two signals (e.g., symbol) of a sounding signal, then the receiver will monitor a received signal until the last two signals match the first two received signals. In some examples, the receiving device transmits a response once the CP (e.g., the last signals that match the first signals) has been received. For example, Wi-Fi APs can perform ranging to identify the distance between the AP and a connected station (STA) by transmitting a sounding signal to the STA. When the STA receives the sounding signal and processes the received signal including part of the CP at the end, the STA responds to the Wi-Fi AP. In this manner, the Wi-Fi AP can determine the distance to the STA based on a duration of time it took for the STA to respond to the sounding signal.

A malice device (e.g., an attacker) may attempt to interrupt or otherwise confuse the communications between an AP and a STA by taking advantage of the repetitive pattern of some Wi-Fi protocols. For example, an attacker may monitor communications between the AP and the STA and recorded the sounding signal and/or part of the sounding signal to generate a fake sounding signal and/or a fake part of a sounding signal. In this manner, the attacker can replay the recorded sounding signal with a time shift to interfere with the sounding signal measurement. For example, an attacker may monitor the communications with the AP and the STA to identify the initial signals of a sounding signal corresponding to the CP and artificially create a fake tap by transmitting the initial signals corresponding to the CP to the STA prior to the intended transmission of the CP. In this manner, the STA will assume that the attacker's CP is part of a complete sounding signal propagating over a channel tap earlier than the actual channel taps. In ranging examples, the STA receiving a fake tap (e.g., a premature artificial CP) results in the STA reporting a time stamp earlier than the actual first channel arrival to the AP, thereby causing an inaccurate distance estimation. Examples disclosed herein prevent attackers from using intercepted CPs and/or entire sounding signals to interfere with communications between an AP and a STA via sounding signals by eliminating repetitive sounding signals and/or adjusting repetitive parts of some sounding signals (e.g., CPs) so that an attacker cannot interfere with the sounding protocol.

FIG. 1 illustrates the transmission of secure sounding symbols in using wireless local area network Wi-Fi protocols between an example access point 100 and an example STA 102. The example of FIG. 1 includes the example AP 100, the example STA 102, example radio architecture 103A, 103B, example secure signal converters 104A, 104B, an example attacker 106, and an example network 108. Although FIG. 1 includes the example AP 100 and the example STA 102, examples disclosed herein may be described in conjunction with two STAs (e.g., a transmitting STA and a responding STA).

The example AP 100 of FIG. 1 is a device that allows the example STA 102 to wirelessly access the example network 108. The example AP 100 may be a router, a modem-router, and/or any other device that provides a wireless connection to a network. A router provides a wireless communication link to a STA. The router accesses the network through a wire connection via a modem. A modem-router combines the functionalities of the modem and the router. The example AP 100 may include the example secure signal converter 104A, additional processors (e.g., the example application processor 1110 of FIG. 11), and/or the example radio architecture 103A. The example radio architecture 103A wireless transmits and receives data based on instructions from the example secure signal converter 104A. The example radio architecture 103A is further described below in conjunction with FIG. 12.

The example STA 102 of FIG. 1 is a Wi-Fi enabled computing device. The example STA 102 may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device. The example STA 102 includes the example received signal converter 104B to receive and analyze sounding signals from the example AP 100. The STA 102 may further include the example radio architecture 103B and/or other processors (e.g., the example application processor 1210 of FIG. 12).

Figure 12:
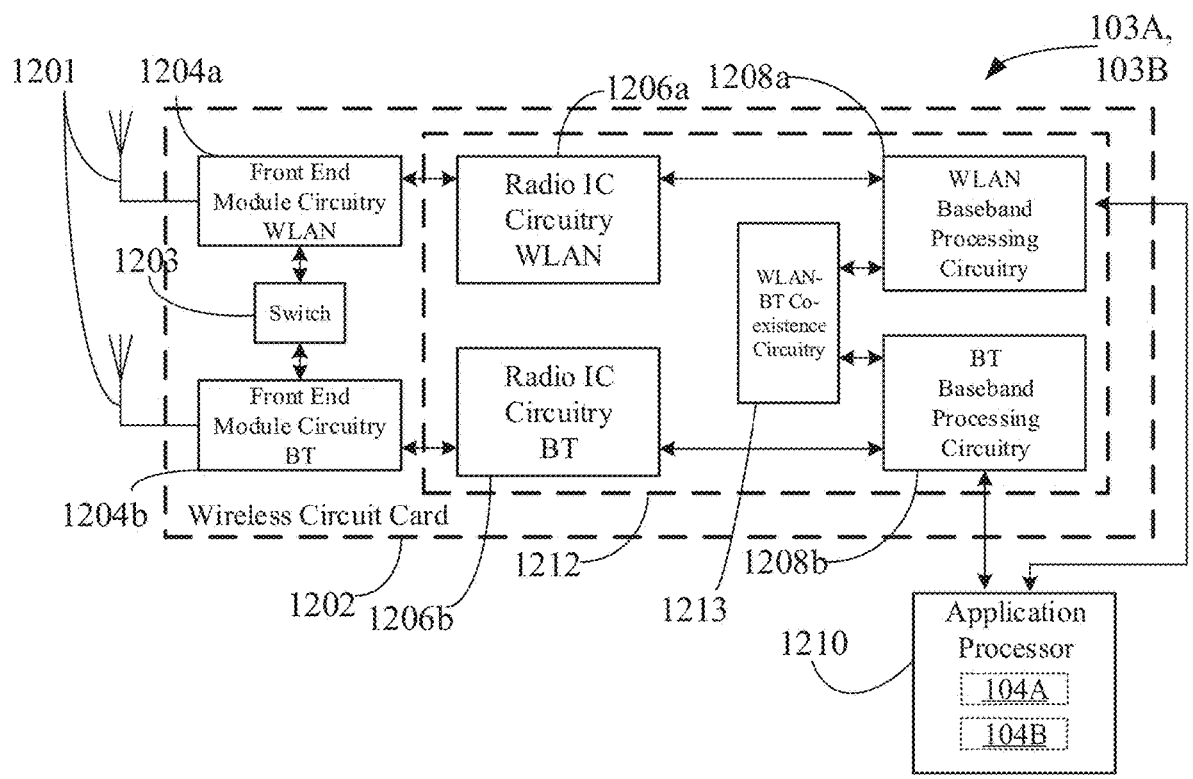
FIG. 12 is a block diagram of a radio architecture in accordance with some examples.

The example secure signal converters 104A, 104B of FIG. 1 receives sounding signals (e.g., OFDM signals used for sounding from the application processor 1210 of FIG. 12) and converts them into secure sounding signals by (A) encrypting the sounding signals with a common key (e.g., a value known to the two ranging wireless devices and unknown to the attacker) and/or a random seed (e.g., an initial vector), (B) generating a zero-energy guard CP for a sounding signal, and/or (C) randomizing the sounding signal e.g. by applying a masking protocol to the sounding signals, so that the example attacker 106 is unable to attack the communications between the example AP 100 and the example STA 102. In some examples, when the input sounding signal includes a CP, the secure signal converters 104A, 104B filter (e.g., windows) the sounding signal to remove (e.g., zero out) the CP from the sounding signal, thereby generating the zero energy guard. Additionally, when the example secure signal converters 104A, 104B receive secure sounding signals from a transmitting device, the secure signal converters 104A, 104B (A) decode the encrypted sounding signals based on the common key and/or random seed and/or (B) decide the sounding signals based on the masking protocol. The example secure signal converters 104A, 104B are further described below in conjunction with FIG. 2.

The example attacker 106 of FIG. 1 intercepts sounding signals between the example AP 100 and the example STA 102. In some examples, the example attacker 106 attempts to (A) receive the initial sounding signals and/or control signal (e.g., a first long training field (LTF) or a second repeated LTF (R-LTF) control signal) to generate a fake tap (e.g., a fake premature CP) and/or (B) attempt to determine the entire sounding signal based on an interception of first sounding symbols. In such examples, the example attacker 106 may transmit a sounding signal to the example AP 100 and/or the example STA 102 prematurely so that a receiver of the AP 100 and/or the STA 102 believes that the sounding signal arrived earlier than it actually does. In this manner, the desired sounding signal is corrupted and certain protocols are attacked. For example, such attacks may correspond with premature responses from the example STA 102 during a ranging protocol, thereby leading to inaccurate distance estimations by the example AP 100. In some examples, the attacker 106 can intercept a sounding signal to attempt to locate a user based on the information in the sounding signal.

The example network 108 of FIG. 1 is a system of interconnected systems exchanging data. The example network 108 may be implemented using any type of public or private network such as, but not limited to, the Internet, a telephone network, a local area network (LAN), a cable network, and/or a wireless network. To enable communication via the network 108, the example Wi-Fi AP 100 includes a communication interface that enables a connection to an Ethernet, a digital subscriber line (DSL), a telephone line, a coaxial cable, or any wireless connection, etc.

Figure 2:
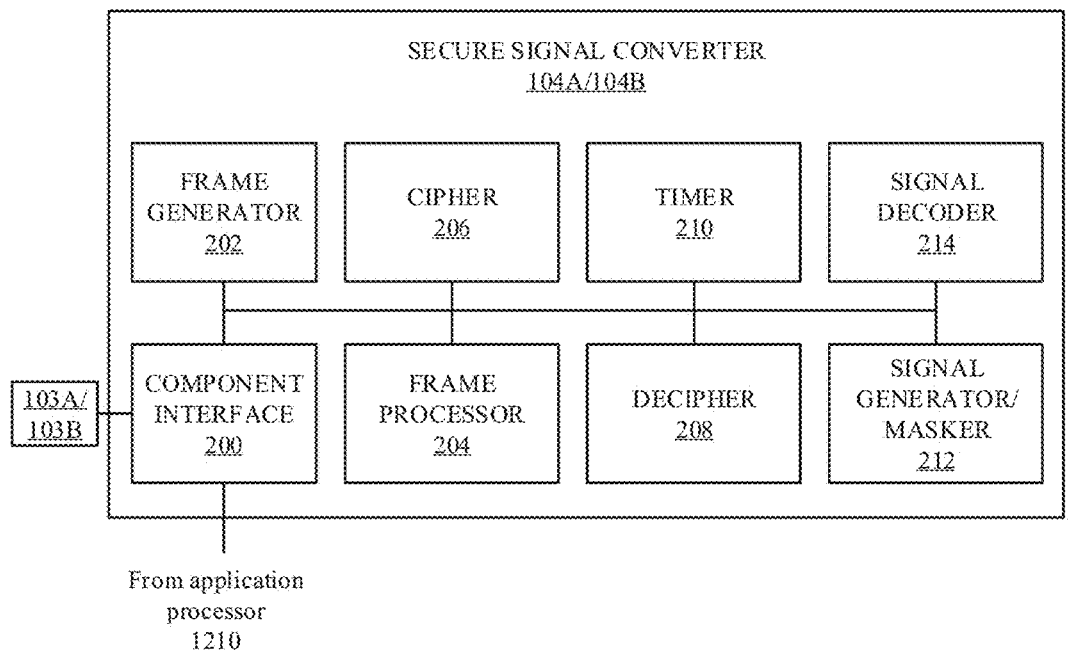
FIG. 2 is a block diagram of one of the example secure signal converters of FIG. 1.

FIG. 2 is a block diagram of one of the example secure signal converters 104A, 104B of FIG. 1, disclosed herein, to secure sounding symbols and/or process secure sounding signals. The example secure signal converter 104A, 104B includes an example component interface 200, an example frame generator 202, an example frame processor 204, an example decipher 208, an example timer 210, an example signal generator/masker 212, and an example signal decoder 214.

The example component interface 200 of FIG. 2 receives and/or transmits data to the example radio architecture 103A, 103B and/or the example application processor 1210 of FIG. 12. The example component interface 200 instructs the radio architecture 103A, 103B to transmit the generated secure sounding signals to a receiving device. Additionally, the component interface 200 receives signals from a transmitting device. The example component interface 200 receives instructions, sounding symbols, and/or sounding signals from the application processor 1210. For example, the application processor 1210 may transmit sounding signals to the example secure signal converter 104A, 104B and the secure signal converter 104A, 104B converts the sounding symbols into sounding signals based on a masking protocol, as further described below. Additionally or alternatively, the component interface 200 may generate, track, and/or update random seed information and/or a common key used to randomize sounding signals.

The example frame generator 202 of FIG. 2 generates signals/packets (e.g., including frames of the signal/packet) corresponding to null data packet announcements, null data packets, and/or sounding signals. For example, the frame generator 202 may generate a null data packet announcement to include random seed information. As further described below, the random seed information corresponds to a random seed value and/or a random seed identifier (e.g., a pointer to a random seed value). The random seed value is used by the cipher 206 to randomize sounding symbols. In this manner, each sounding symbol will be random to the attacker 106, thereby reducing/eliminating the repetitive structure of multiple sounding measurements. The receiving device can decipher the sounding signal based on the random seed value. In some examples, the frame generator 202 may generate the frames of an NDP sounding signals (e.g., the preamble, one or more LTF signals, etc.). Additionally, the frame generator 202 may track the use of the random seeds to determine if the common key should be updated (e.g., when a threshold number of random seeds have been used, based on a number of sounding measurements, based on a timer, randomly, etc.). In some examples, the random seed value may be used by the frame generator 202 directly without the cipher 206 operations. The frame generator 202 may use the random seed value to generate sounding signals. The random seed value may be indicated by an identifier in a null data packet announcement. In some examples, a trigger frame instead of a null data packet announcement frame may precedes the null data packet frame. In such examples, the random seed information may be included in the trigger frame.

The example frame processor 204 of FIG. 2 processes received frames/packets to extract information. For example, when the component interface 200 receives a null data packet announcement, the frame processor 204 processes the frames of the null data packet announcement to obtain the information embedded therein, including the random seed information. Additionally, the frame processor 204 may gather information from NDP sounding signals, location measurement reports, and/or any other received data packets/frames.

The example cipher 206 of FIG. 2 generates random sounding bits used to generate a sounding signal. For example, the cipher 206 obtains a common key value and a random seed value (e.g., from a location measurement report, a null data packet announcement (NDPA), initial negotiations, and/or from the application processor 1210) and generates the random sounding bits/symbols based on the common key value and the random seed value. For example, the cipher 206 may use the random seed (e.g., initial vector or nonce) as an initial input. Additionally or alternatively, the cipher 206 may use the common key to derive a sequence of key bits that are masked onto the intermediate and/or final encrypted bits in one or more steps of encryption. The random sounding bits may be used to generate the random symbols mapped to subcarriers in the frequency domain and/or random cyclic shifts in the time domain. As described above, the frame generator 202 generates a sounding signal based on the random sounding bits/symbols. In some examples, the random sounding bits may be specified directly in the location measurement report and the pointer of the random sounding bits may be specified in the null data packet announcement.

The example decipher 208 of FIG. 2 deciphers a received sounding signal based on the random sounding bits and/or common key used to generate the sounding signal. The common key is exchanged between the AP 100 and the STA 102 during initial negotiations and the random seed information is received in a NDPA and/or location measurement report. Accordingly, the decipher 208 will know the common key and/or random seed value and be able to correctly decipher the received, ciphered sounding signal so that the frame processor 204 can process the deciphered signal.

The example timer 210 of FIG. 2 tracks an amount of time and/or samples associated with a zero energy guard (e.g., a zero energy CP). For example, after a sounding signal preamble is transmitted, the timer 210 waits for a duration of time (e.g., a zero energy guard duration), where the component interface 200 instructs the radio architecture 103A, 103B to not transmit energy for the zero energy guard duration. Additionally, the timer 210 may wait for a duration of time corresponding to zero energy guard between a first LTF sounding symbol and a second LTF sounding symbol and/or after a final LTF sounding symbol. Using the zero energy guard as a CP prevents the attacker 106 from generating a fake tap based on the CP, because doing so would correspond to the attacker 106 doing nothing (e.g., sending zero energy), which would not affect transmissions between the AP 100 and the STA 102. Additionally, a zero energy guard may prevent multipath interference caused by the STF of the preamble. Additionally, a zero energy guard may be used to accommodate multipaths of a last LTF symbol.

The example signal generator/masker 212 of FIG. 2 eliminates the repetitive nature of a subsequent LTF signal of a sounding signal by performing a masking protocol on one or more of the LTF and/or generating the sounding signal with a first sequence in a frequency domain. For example, in multi-antenna sounding systems, some Wi-Fi protocols transmit a first LTF signal during a first interval and a second LTF signal (e.g., which is the same as the first LTF signal) during a second interval. However, as described above, the attacker 106 can record the first LTF signal and use it to perform an attack because of the repetitive nature of the second LTF signal. Accordingly, the signal generator/ masker 212 masks the first LTF signal and/or the second LTF signal so that both signals correspond to the same information but are different sounding signals. For example, even though the original LTF signals before masking are the same e.g. all ones, the LTF signals are different after the masking. For example, the signal generator/masker 212 may generate and/or obtain (e.g., from the frame generator 202 or the application processor 1210) different LTF sequences and applying the first LTF sequence to the first LTF symbols in the frequency domain and applying the second, different LTF sequence to the second LTF symbols in the frequency domain. The example signal generator/masker 212 converts signals into the time domain. Accordingly, the first LTF symbols and the second LTF symbols are the same but convert to LTF signals that are different in the time domain. Additionally or alternatively, the signal generator/masker 212 may generate and/or obtain a masking sequences and multiply the first masking sequence by the first LTF sequence/symbols (e.g., in the frequency domain) and multiply the second masking sequence by the second LTF sequence/symbols, thereby removing the repetitive nature of the second LTF signal. Additionally, the example signal generator/masker 212 may modulate the phase of the first and/or second symbol by an angle of 180 degrees, for example, to facilitate a P-matrix encoding protocol (e.g., to generate a linear system that can be solved by a receiving device to differentiate signals transmitted on different antennas of the transmitting device), as further described below. In some examples, the signal generator/masker 212 may generate the masks to be the sounding signals, instead of generating the sounding signal and then masking the sounding signals. In some examples, when the common signal is a sequence of all ones or all zeros, the signal generator/masker 212 may determine that no making is needed, but rather the output bits are the same or opposite of the making sequence. In some examples, the signal generator/masker 212 is implemented in the frame generator 202.

The example signal decoder 214 of FIG. 2 decodes received signals that have been masked, as described above. For example, when a sounding signal has been received that is masked, the example signal decoder 214 decodes the received signal based on the masking protocol. For example, if the sounding signal was generated by applying different LTF sequences in the frequency domain and converting the sequences to the time domain, the signal decoder 214 may multiply the conjugate sequence of the LTF sequence with the received signal in the frequency domain to obtain the unmasked sounding signal. In some examples, the sounding signals may be masked using various other/additional masking techniques. The example signal decoder 214 decodes the masked sounding signals based on the masking protocol(s) used to mask the signal (e.g., which is known to both the transmitting device and the receiving device). Additionally, the example signal decoder 214 may perform P-matrix decoding (e.g., for multiple antenna sounding). For example, when a first signal includes a signal (e.g., A) transmitted on a first antenna and a signal (e.g., B) transmitted on a second antenna, the first received signal corresponds to $S_1=gA+hB$, where g and h are the channel responses from the first and the second transmit antennas to the receive antenna, respectively. In such an example, when a second received signal includes a signal (e.g., A) transmitted on the first antenna and a phase rotated signal (e.g., −B, if the phase rotated by 180 degrees), then the second signal corresponds to $S_2=gA-hB$. Accordingly, the signal decoder 214 may determine g and/or h by knowing the randomized sounding signals A and B and solving the system of equations.

While an example manner of implementing the example secure signal converters 104A, 104B is illustrated in FIG. 2, one or more of the elements, processes and/or devices illustrated in FIG. 2 may be combined, divided, re-arranged, omitted, eliminated and/or implemented in any other way. Further, the example component interface 200, the example frame generator 202, the example frame processor 204, the example cipher 206, the example decipher 208, the example timer 210, the example signal generator/masker 212, the example signal decoder 214, and/or, more generally, the secure signal converters 104A, 104B of FIG. 2 may be implemented by hardware, software, firmware and/or any combination of hardware, software and/or firmware. Thus, for example, any of the example component interface 200, the example frame generator 202, the example frame processor 204, the example cipher 206, the example decipher 208, the example timer 210, the example signal generator/masker 212, the example signal decoder 214, and/or, more generally, the secure signal converters 104A, 104B of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 200, the example frame generator 202, the example frame processor 204, the example cipher 206, the example decipher 208, the example timer 210, the example signal generator/masker 212, the example signal decoder 214, and/or, more generally, the secure signal converters 104A, 104B of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example secure signal converters 104A, 104B of FIG. 2 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example secure signal converters 104A, 104B of FIG. 2 are shown in FIGS. 3-7. In this example, the machine readable instructions comprise a program for execution by a processor such as the processor 1612 shown in the example processor platform 1600 discussed below in connection with FIG. 16. The program may be embodied in software stored on a non-transitory computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIGS. 3-7, many other methods of implementing the example secure signal converters 104A, 104B may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operationalamplifier (op-amp), a logic circuit, etc.) structured to perform the corresponding operation without executing software or firmware.

As mentioned above, the example processes of FIGS. 3-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 3:
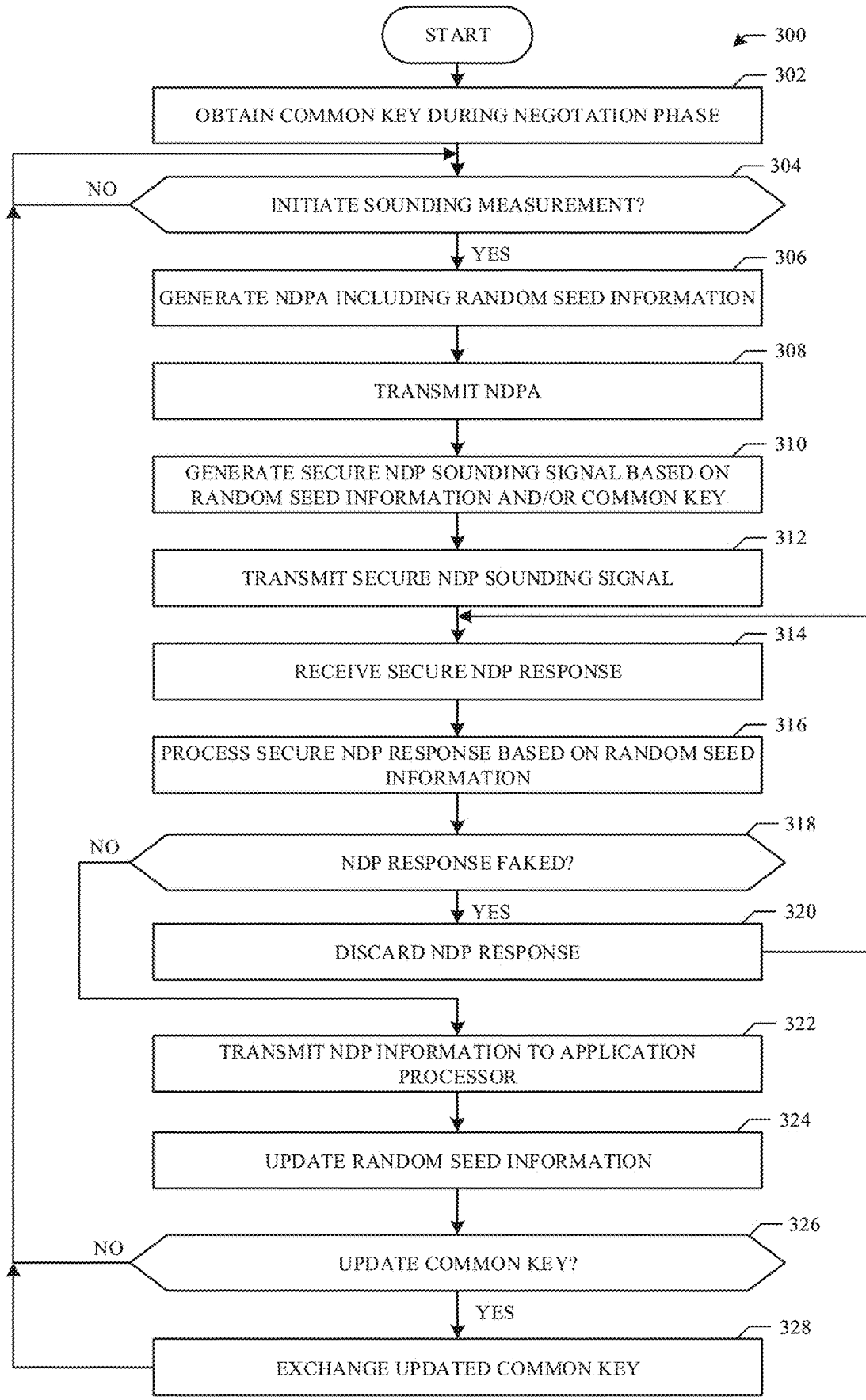
FIGS. 3-7 are a flowchart representative of example machine readable instructions that may be executed to implement the example secure signal converter of FIGS. 1 and 2.

FIG. 3 is an example flowchart 300 representative of example machine readable instructions that may be executed by the example secure signal converters 104B of FIG. 2 implemented in the example STA 102 to generate a secure sounding signal using a common key and/or a random seed. Although the flowchart 300 of FIG. 3 is described in conjunction with the example secure signal converter 104B of FIG. 2, the instructions may be executed by any secure signal converter in any station or access point (e.g., the example AP 100 of FIG. 1).

At block 302, component interface 200 obtains a common key during the negotiation phase (e.g., initialization and/or association phase). For example, the component interface 200 may obtain a common key from the example AP 100 via the example radio architecture 103B. The common key is a key that is shared by the AP 100 and STA 102 that may be used to generate the secure signal exchanges by encrypting the payload exchanges between the AP 100 and the STA 102 based on the common key. In some examples, the exchange occurs during initial negotiations. Because the attacker 106 does not know the common key, the attacker 106 will not know how to decode the sounding symbol. At block 304, the example secure signal converter 104B determines if a sounding measurement is to be initiated. For example, if the secure signal converter 104B determines that a sounding measurement is to be initiated when the component interface 200 receives instructions to initiate a sounding measurement from the example application processor 1210 of FIG. 12.

If the example secure signal converter 104B determines that the sounding measurement is not to be initiated (block 304: NO), the secure signal converter 104B waits until a sounding measurement is to be initiated. If the example secure signal converter 104B determines that the sounding measurement is to be initiated (block 304: YES), the example frame generator 202 generates a null data packet announcement (NDPA) including random seed information (block 306). The NDPA is a control frame. The NDPA includes information related to the sounding measurement including the length of the sounding exchanges, a sounding dialog token to identify a very high throughput (VHT) NDPA frame, random seed information, and/or other PHY level data. The random seed information corresponds to a random value (e.g., a random seed) that is used as a key for a single sounding measurement and is changed to a different random value for a subsequent sounding measurement. Accordingly, even if a subsequent sounding signal includes the same information as a previous sounding signal, the subsequent sounding signal will be ciphered differently using the random seed, resulting in a different sounding signal. In this manner, the attacker 106 will not be able to attack a sounding signal by transmitting a fake tap based on a previously recorded sounding signal that is time shifted. The seed information may correspond to the actual random seed value or an identifier of a random seed value (e.g., a pointer value, so that the receiving device can access the random seed based on the pointer value). The seed information may be included in the NDPA in a variety of ways, as further described below in conjunction with FIG. 8.

At block 308, the example component interface 200 instructs the radio architecture 103B to transmit the NDPA with the random seed information to the example AP 100. At block 310, the example cipher 206 and the example frame generator 202 generates a secure NDP sounding signal based on the random seed information and/or the common key. For example, the cipher 206 generates random bits (e.g., values) based on the common key and the random seed. The random bits are used to generate random symbols (e.g., random 8PSK symbols) the random symbols are mapped to the subcarriers in the frequency domain, the frequency domain signal is converted into the time domain sounding symbol, and/or a random cyclic shift is applied to the time domain sounding symbol. The example frame generator 202 generates the sounding signal based on the sounding symbol(s) (e.g., from the application processor 1210 of FIG. 12) and the random bits output by the cipher 206). At block 312, the example component interface 200 instructs the radio architecture 103B to transmit the secure NDP sounding signal to the example AP 100.

At block 314, the example component interface 200 receives a secure NDP response via the example radio architecture 103B. As further described below in conjunction with FIG. 4, the example AP 100 responds to the secure NDP with a secure NDP response. The NDP response is a sounding signal transmitted in response to receiving a sounding signal. The NDP response is used by the transmitting device (e.g., the STA 102) to complete the sounding measurement. At block 316, the example decipher 208 processes the secure NDP response based on the random seed information. For example, the decipher 208 deciphers the received NDP response to decode the received signal based on the random seed used to generate the NDP response in order for the application processor 1210 to be able to obtain data from the NDP response. The random seed used for the NDP response may be the same as or different than the random seed used for the transmitted secure NDP, so long as the random seed information is known to both the AP 100 and the STA 102.

At block 318, the example decipher 208 determines if the received NDP response is a fake. For example, because the attacker 106 does not know the random seed information, the attacker 106 may attempt to transmit a fake NDP response that is not generated based on the random seed and/or common key. In such an example, the decipher 208 will not be able to correctly decipher the NDP response correctly because the fake NDP response has not been ciphered with the random seed and/or common key. Accordingly, the decipher 208 will determine that the NDP response is a fake, because it was not ciphered with the common key and/or random seed. If the example decipher 208 determines that the NDP response is a fake (block 318: YES), the decipher 208 discards the NDP response (block 320) and the process returns to block 314 until a legitimate NDP response is received. If the example decipher 208 determines that the NDP response is not a fake (block 318: NO), the component interface 200 transmits the NDP information to the example application processor 1210 of FIG. 12 for further processing (block 322).

At block 324, the example secure signal converter 104B updates the random seed information for a subject sounding measurement. For example, the application processor 1210 may transmit a new random seed value and/or identifier for the cipher 206, the decipher 208, and/or the frame generator 202 to use in a subsequent sounding measurement. In some examples, the component interface 200 instructs the application processor 1210 to transmit the updated random seed information to the AP 100 in a measurement location report. In some examples, the component interface 200 instructs the application processor 1210 to transmit the updated random seed information to the AP 100 in a subsequent NDPA. In some examples, the component interface 200 receives updated random seed information from the AP 100 via the example radio architecture 103B.

At block 326, the example frame generator 202 determines if the common key should be updated. For example, the frame generator 202 may determine that a common key should be updated periodically, aperiodically, and/or based on a trigger (e.g., when all of the random seeds have been used). If the example frame generator 202 determines that the common key should not be updated (block 326: NO), the process returns to block 304 for a subsequent sounding measurement. If the example frame generator 202 determines that the common key should be updated (block 326: YES), the component interface 200 exchanges an updated common key with the example AP 100 (block 328). The frame generator 202 and/or the application processor 1210 may generate the updated common key to be exchanged.

Figure 4:
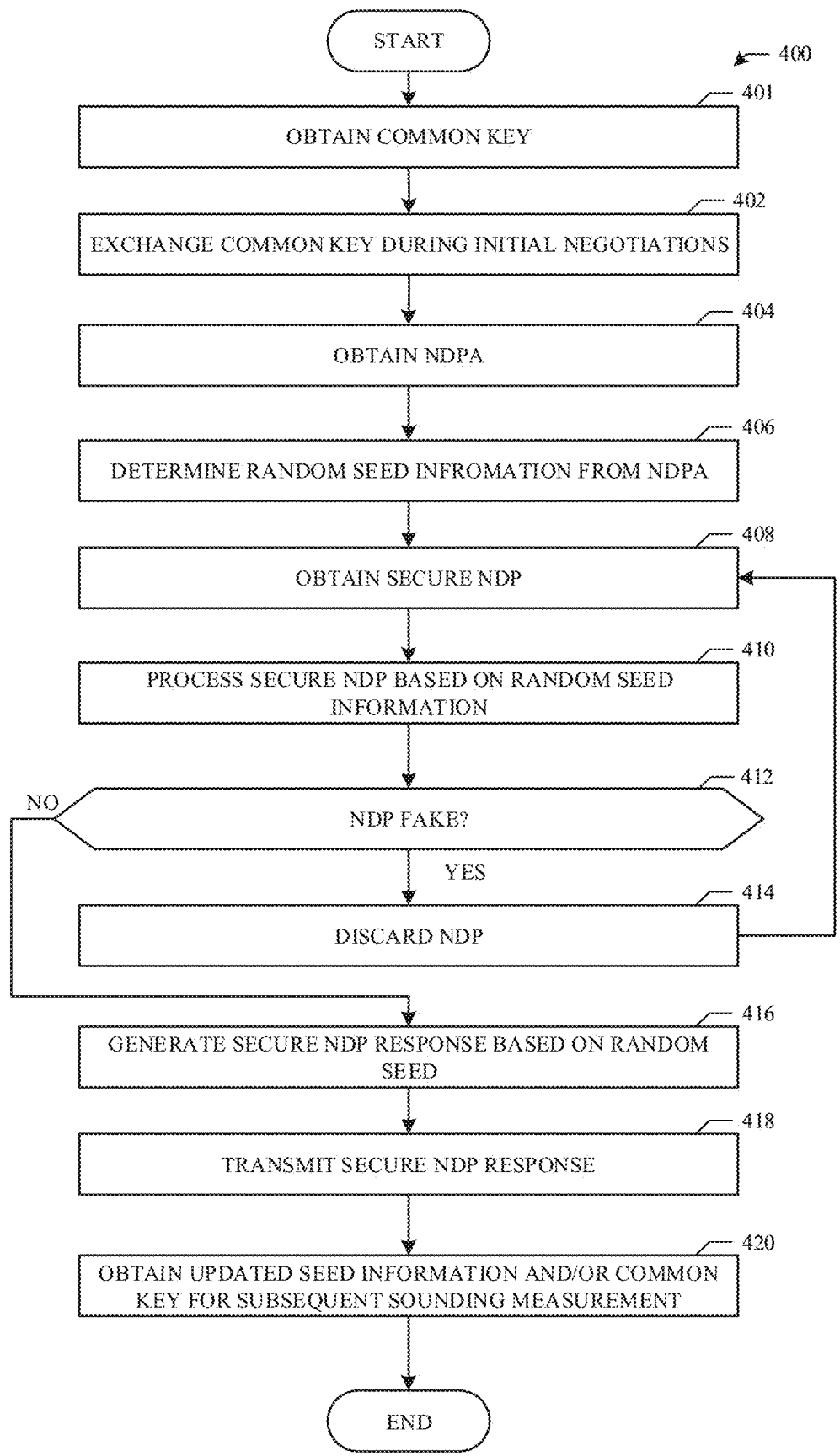

FIG. 4 is an example flowchart 400 representative of example machine readable instructions that may be executed by the example secure signal converters 104A of FIG. 2 implemented in the example AP 100 to process a secure sounding signal using a common key and/or a random seed. Although the flowchart 400 of FIG. 4 is described in conjunction with the example secure signal converter 104A of FIG. 2, the instructions may be executed by any secure signal converter in any station or access point (e.g., the example STA 102 of FIG. 1).

At block 401, component interface 200 obtains a common key. For example, the component interface 200 may obtain a common key generated by the application processor 1210 of FIG. 12. The common key is a key that is shared by the AP 100 and STA 102 that may be used to generate the secure sounding signal by encrypting the sounding signal based on the common key. Because the attacker 106 does not know the common key, the attacker 106 will not know how to decode the sounding symbol. At block 402, the example component interface 200 instructs the radio architecture 103A to exchange the common key during initial negotiations (e.g., initiations or associations) with the example STA 102.

At block 404, the example component interface 200 obtains a received NDPA from the example radio architecture 103A. For example, when a sounding measurement is initiated, the example STA 102 transmits the NDPA to the AP 100 with information corresponding to the sounding measurement. At block 406, the example frame processor 204 processes the received NDPA to determine the random seed information from the NDPA. As described above, the random seed information corresponds to how to decipher a received NDP and/or how to cipher an NDP response. The random seed information may be included in various parts of the NDPA, as further described below in conjunction with FIG. 9.

At block 408, the example component interface 200 obtains a secure NDP via the example radio architecture 103A. At block 410, the example decipher 208 processes the secure NDP based on the random seed information determined from the NDPA at block 406. For example, the decipher 208 deciphers the received NDP to decode the received signal based on the random seed used to generate the NDP in order for the application processor 1210 to be able to obtain data from the NDP.

At block 412, the example decipher 208 determines if the received NDP is a fake. For example, because the attacker 106 does not know the random seed information, the attacker 106 may attempt to transmit a fake NDP that is not generated based on the random seed and/or common key. In such an example, the decipher 208 will not be able to correctly decipher the NDP correctly because the fake NDP has not been ciphered with the random seed and/or common key. Accordingly, the decipher 208 will determine that the NDP is a fake, because it was not ciphered with the common key and/or random seed. If the example decipher 208 determines that the NDP is a fake (block 412: YES), the decipher 208 discards the NDP (block 414) and the process returns to block 408 until a legitimate NDP is received. If the example decipher 208 determines that the NDP is not a fake (block 412: NO), the component interface 200 generates a secure NDP response based on a random seed and/or the common key (block 416). The random seed may be the same as or different from the random seed used to cipher the NDP. In some examples, the component interface 200 transmits the legitimate NDP information of the application processor 1210 of FIG. 12. For example, the cipher 206 generates random bits based on the common key and the random seed. Using the random bits random symbols (e.g., random 8PSK symbols) are generated and mapped to the subcarriers in the frequency domain. After the frequency domain signal is converted into time domain, a random cyclic shift in the time domain may be applied. In some examples, the cyclic shift in the time domain can be equivalently implemented in the frequency domain. For example, a linear phase shift is applied to the random symbols in the frequency domain before the random symbols are converted into the time domain. The example frame generator 202 generates the sounding signal based on the sounding symbol(s) (e.g., from the application processor 1210 of FIG. 12) and the random bits output by the cipher 206). At block 418, the example component interface 200 instructs the radio architecture 103A to transmit the secure NDP to the STA 102.

At block 420, the example component interface 200 obtains updated seed information and/or a common key for a subsequent sounding measurement via the example radio architecture 103A and/or the example application processor 1210 of FIG. 12. For example, the application processor 1210 may update the random seed used for a subsequent sounding measurement. In such examples, the component interface 200 may transmit the updated seed information to the example STA 102. In some examples, the updated seed information is obtained from the example STA 102 via the example radio architecture 103A. For example, the updated seed information may be included in a time measurement report or a subsequent NPDA from the example STA 102. In some examples, the STA 102 may update the common key to a new common key. In such examples, if the component interface 200 receives a new common key, the application processor 1210 updates the common key used for a subsequent sounding measurement.

Figure 5:
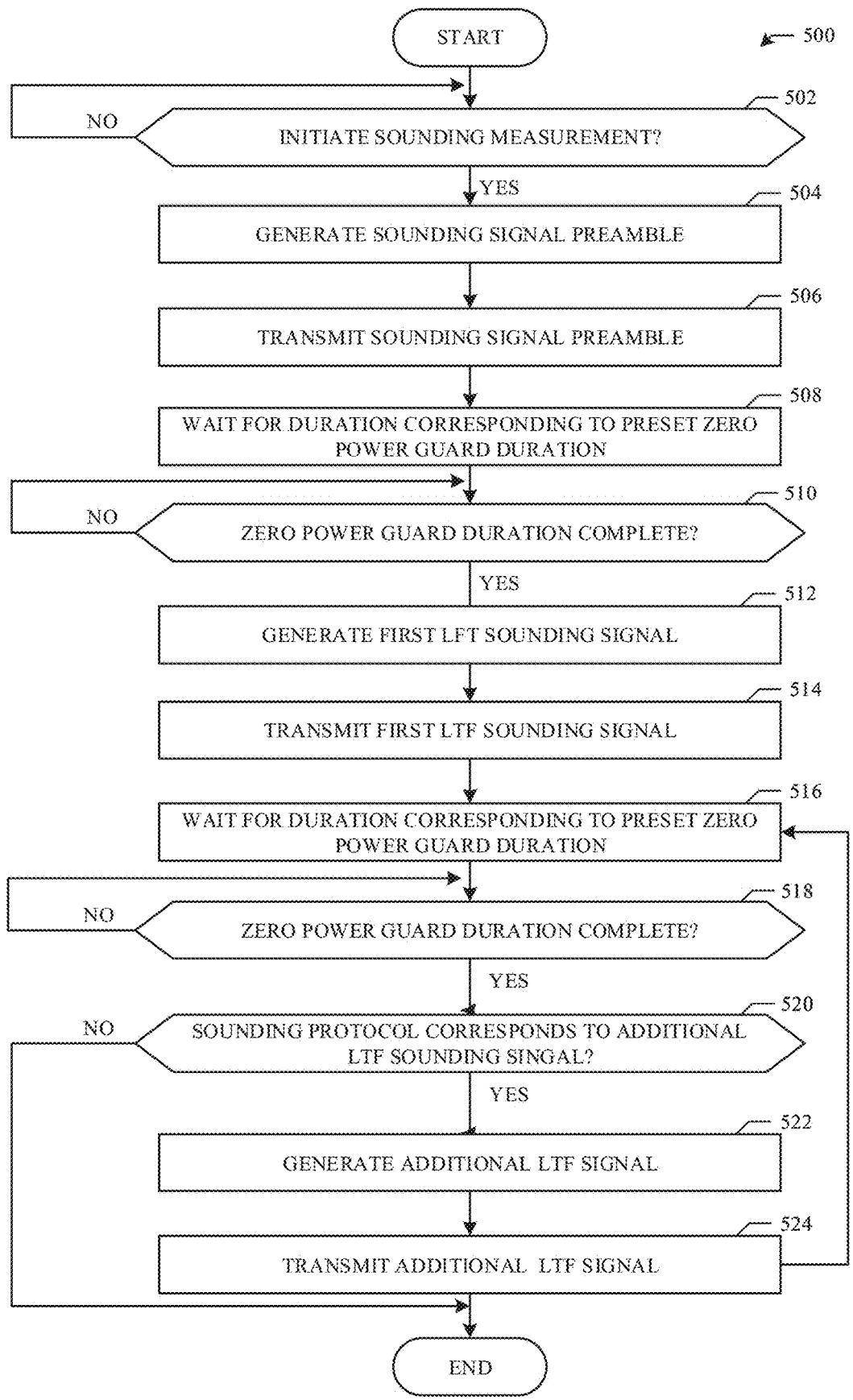

FIG. 5 is an example flowchart 500 representative of example machine readable instructions that may be executed by either one of the example secure signal converters 104A, 104B of FIG. 2 implemented in the example AP 100 or the example STA 102 to transmit a secure sounding signal with a zero energy guard CP. Although the flowchart 500 of FIG. 5 is described in conjunction with the example secure signal converters 104A, 104B of FIG. 2, the instructions may be executed by any secure signal converter in any station or access point.

At block 502, the example component interface 200 determines whether a sounding measurement is to be initiated based on instructions from the example application processor 1210. If the example component interface 200 determines that the sounding measurement is not to be initiated (block 502: NO), the process returns to block 502 until the sounding measurement is to be initiated. If the example component interface 200 determines that the sounding measurement is to be initiated (block 502: YES), the example frame generator 202 generates a sounding signal preamble (block 504). An example of a sounding signal preamble is further described below in conjunction with FIG. 9. At block 506, the example component interface 200 transmits the sounding signal preamble by instructing the application processor 1210 to transmit the sounding signal preamble.

At block 508, the example timer 210 waits for a duration of time corresponding to the preset zero guard duration. The zero guard duration is a duration of time corresponding to a zero energy transmission used as a CP. Using a zero guard energy prevents the attacker 106 from recordings the CP and transmitting a fake tap with the CP earlier than the intended repeated CP should be sent. For example, if the CP is non-zero, the CP is transmitted at the beginning of a sounding signal, so that the receiving device knows what the CP is, and at the end of the sounding signal, identifying the end of the sounding signal. In such an example, the attacker 106 records the non-zero CP and transmits the second CP early, thereby indicating that the sounding signal is complete, even though it has not yet completed, resulting in an inaccurate sounding measurement. However, if the CP is a zero-energy signal, even if the attacker 106 transmits the zero-energy signal as a fake tap, the receiving device will not receive anything from the attacker 106 and will continue to receive the sounding signal from the legitimate device, thereby preventing the attacker 106 from successfully attacked the sounding measurement.

At block 510, the example timer 210 determines if the zero energy guard duration is complete. The zero energy guard duration is further described below in conjunction with FIG. 10. If the example timer 210 determines that the zero energy guard duration is not complete (block 510: NO), the secure signal converter 104A, 104B continues to output zero energy until the zero energy guard duration is complete. If the example timer 210 determines that the zero energy guard duration is complete (block 510: YES), the frame generator 202 generates a first LTF sounding signal (e.g., an NDP or other control frame) (block 512). At block 514, the example component interface 200 transmits the first LTF sounding signal via the example radio architecture 103A, 103B.

At block 516, the example timer 210 waits for a duration of time corresponding to the preset zero guard duration. The preset zero guard duration may be the same, or a different, duration as the zero guard duration of block 508. In some examples, there may not be a second zero guard duration (e.g., if there is not another LTF sounding signal to send during the sounding measurement). At block 518, the example timer 210 determines if the zero energy guard duration is complete. The zero energy guard duration is further described below in conjunction with FIG. 10. If the example timer 210 determines that the zero energy guard duration is not complete (block 518: NO), the secure signal converter 104A, 104B continues to output zero energy until the zero energy guard duration is complete.

If the example timer 210 determines that the zero energy guard duration is complete (block 518: YES), the frame generator 202 determines if the sounding measurement corresponds to an additional LTF sounding signal (block 520). For example, the sounding signal may include 2×LTF sounding signals (e.g., a first LTF and a second R-LTF). If the example frame generator 202 determines that the sounding measurement does not correspond to an additional LTF sounding signal (block 520: NO), the process ends. If the example frame generator 202 determines that the sounding measurement corresponds to an additional LTF sounding signal (block 520: YES), the frame generator 202 generates an additional LTF sounding signal (e.g., an NDP or other control frame) (block 522). At block 524, the component interface 200 transmits the additional LTF signal via the example radio architecture 103A, 103B and the process returns to block 516.

Figure 6:
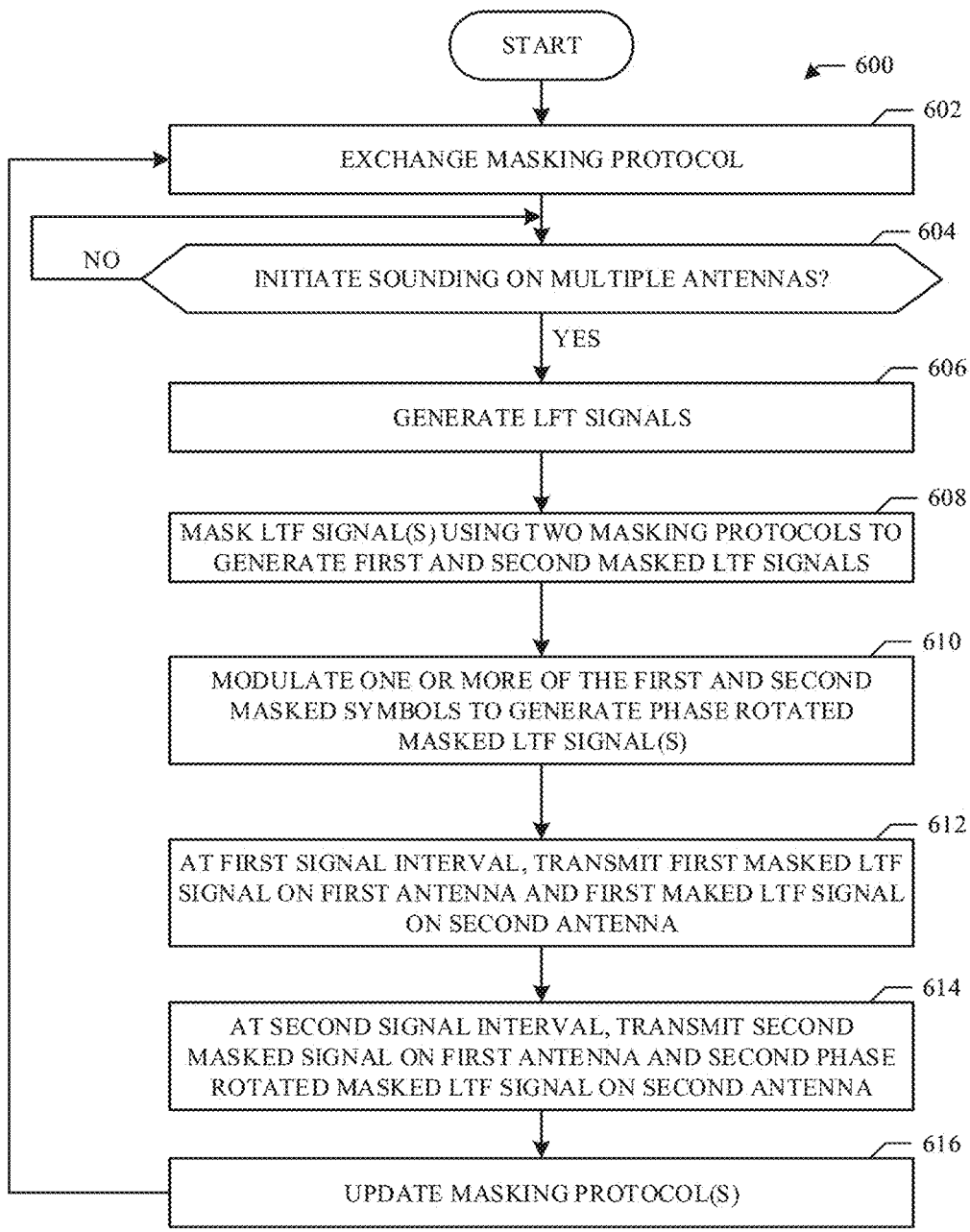

FIG. 6 is an example flowchart 600 representative of example machine readable instructions that may be executed by either one of the example secure signal converters 104A, 104B of FIG. 2 implemented in the example AP 100 or the example STA 102 (e.g., as a transmitting device) to transmit a masked sounding signal being transmitted between the AP 100 and the STA 102. Although the flowchart 600 of FIG. 6 is described in conjunction with the example secure signal converters 104A, 104B of FIG. 2, the instructions may be executed by any secure signal converter in any station or access point. The flowchart 600 of FIG. 6 is described in conjunction with an LTF sounding signal for two transmit antennas (e.g., where the sounding protocol corresponds to transmitting a first LTF signal at a first interval of time and sending a second LTF signal at a second interval of time). Four phase rotations may be applied to the four LTF signals used by the first and the second antennas in the two time intervals. The phase rotations may be specified in a 2×2 matrix e.g. 2×2 P-matrix (e.g., as defined in IEEE 802.11). Alternatively, the flowchart 600 may be used to describe the encoding of the LTF signal for any number of transmit antennas (e.g., 3, 4, 5, 6, 7, 8, etc.). The phase rotations may be specified in matrices of size 4×4, 6×6, 8×8, etc. In one example, multiple, different LTF signals may be generated for the same set of transmit antennas. For example, the transmitter may sound the channel multiple times using different sounding signals for enhancing the measurement accuracy and security protection. For example, a first two different LTF signals are generated for a first 2 time intervals and for two transmit antennas. Four phases of a 2×2 P-matrix are used to rotate the phases of the two different LTF signals generating 4 LTF signals for the two transmit antennas to send in the first two time intervals. A second two different LTF signals different from the first two are generated for a second 2 time intervals and for the same two transmit antennas. For a single transmit antenna, multiple different LTF signals may be sent in each time interval, respectively (e.g., sounding repetition).

At block 602, the example component interface 200 exchanges a masking protocol with the device that is receiving the sounding signal (e.g., the AP 100 when the STA 102 is transmitting the sounding signal or the STA 102 when the AP 100 is transmitting the sounding signal). For example, the component interface 200 may receive the masking protocols from the application processor 1210 or the secure signal converter 104A, 104b may generate the masking protocols. In some examples, the exchange occurs during initial negotiations. As further described in conjunction with FIG. 11, the masking protocol may be a masking sequence that is applied to (e.g., multiplied by) the sounding signal. Additionally or alternatively, the masking protocol may correspond to different LTF signals being generated by applying different LTF sequences in the frequency domain and converting the sequence into the time domain. In this manner, the receiving device can remove the LTF sequence by multiplying a conjugate sequence of the LTF sequence with the received signal in the frequency domain to decode the masked signal.

At block 604, the example component interface 200 determines if sounding on multiple antennas should be initiated. For example, the component interface 200 may determine that sounding on the multiple antennas should be initiated when instructions have been received from the application processor 1210 of FIG. 12. If the example component interface 200 determines that sounding on multiple antennas should not be initiated (block 604: NO), the process returns to block 604 until sounding is initiated. If the example component interface 200 determines that sounding on multiple antennas should be initiated (block 604: YES), the example frame generator 202 generates the LTF signal(s) (block 606). For example, the frame generator 202 may generate the LTF signal based on an LTF symbol from the application processor 1210 and/or random bits generated by the example cipher 206. In some examples, the application processor 1210 may generate the LTF signal(s) and the component interface 200 may receive the LTF signal(s) from the application processor 1210. The example frame generator 202 may generate the LTF sequence based on a common key, a sounding dialog token, and/or a random seed (e.g., which are known to both the transmitting device and the receiving device). Although the example flowchart 600 is described in conjunction with an LTF sounding signal for two transmit antennas, the LTF signal may only include one LTF signal to be transmitted during one interval of time.

At block 608, the example signal generator/masker 212 masks the LTF signal(s) using two different masking protocols to generate the first and second masked LTF signals. The masking protocols correspond to the masking protocols that were exchanged at block 602. At block 610, the example signal generator/masker 212 modulates one or more of the first and/or second masked symbols to generate a first and/or second phase rotated masked LTF signals. For example, the signal generator/masker 212 may module (e.g., apply a 180 degree phase rotation) the second masked symbol to generate a second phase rotated masked LTF signal whose phase is different from the first modulated signal. Additionally, the signal generator/masker 212 may module (e.g., apply a 90 degree phase rotation) the first masked symbol to generate a first phase rotated masked LTF signal whose phase is different from the second phase modulated signal.

At block 612, at the first signal interval, the example component interface 200 transmits the first masked LTF signal on a first antenna and the first masked LTF signal on a second antenna (e.g., by instructing the example radio architecture 103A, 103B). At block 614, at the second signal interval, the example component interface 200 transmits the second masked signal (e.g., masked with a different protocol from the first masking signal) on the first antenna and the second phase rotated masked LTF signal on the second antenna (e.g., by instructing the example radio architecture 103A, 103B). In this manner, once the receiving device receives the transmitted signals at the first and second signal intervals, the receiving device can decode the signals based on the masking protocol and perform a P-matrix decoding protocol to differentiate the signal transmitted on the first antenna from the signal transmitted on the second antenna, as further described below. Examples of the masking protocol is further described below in conjunction with FIG. 11. At block 616, the example application processor 1210 and/or the secure signal converter 104A, 104B updates the masking protocols for subsequent signal sounding. In this manner, even if the LTF signals are repeated for subsequent signal sounding, the different masking protocols will prevent the attacker 106 from using previously recorded sounding signals to attack a sounding protocol. In some examples, the process (e.g., blocks 604-616) may repeat multiple times (e.g., 2 or 3) before the application processor 1210 and/or the secure signal converter 104A, 104B update the masking protocols for subsequent signal sounding.

Figure 7:
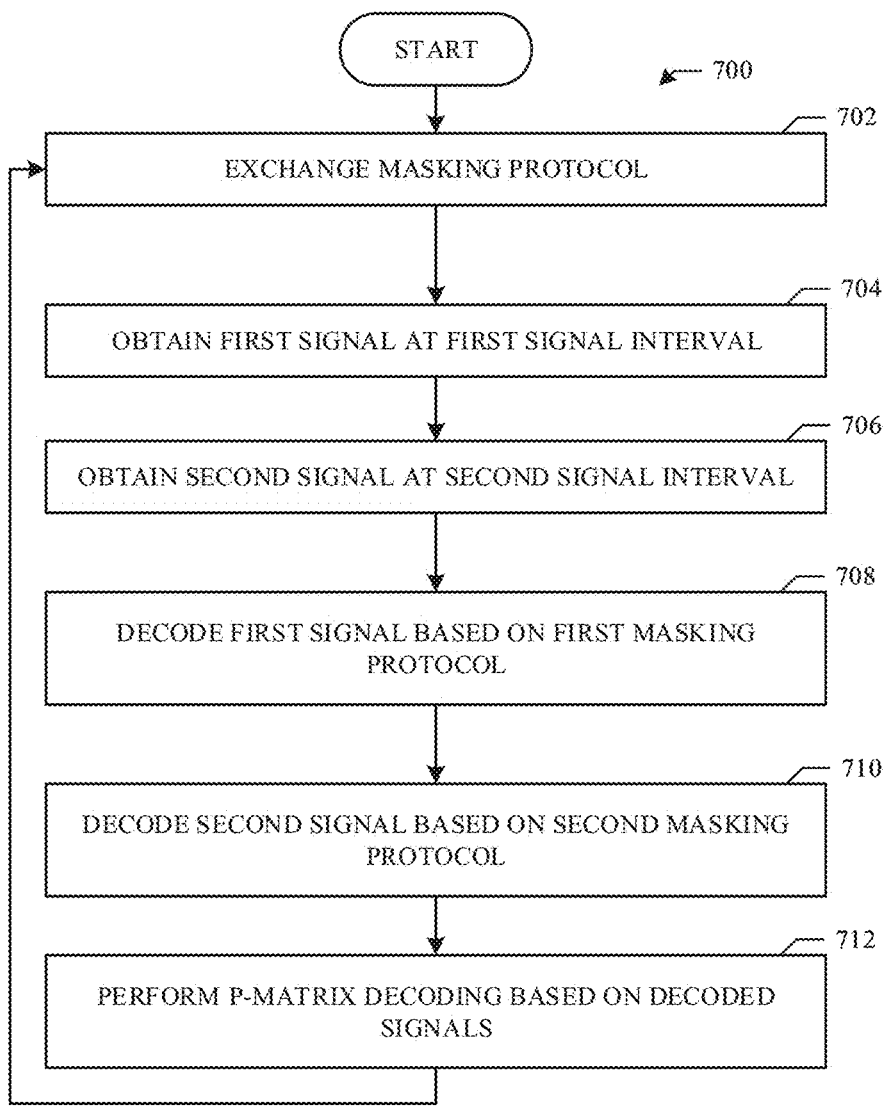

FIG. 7 is an example flowchart 700 representative of example machine readable instructions that may be executed by either one of the example secure signal converters 104A, 104B of FIG. 2 implemented in the example AP 100 or the example STA 102 (e.g., as a receiving device) to receive a masked sounding signal being transmitted between the AP 100 and the STA 102. Although the flowchart 700 of FIG. 7 is described in conjunction with the example secure signal converters 104A, 104B of FIG. 2, the instructions may be executed by any secure signal converter in any station or access point. The flowchart 700 of FIG. 7 is described in conjunction with a LTF sounding signal for two transmit antennas (e.g., where the sounding protocol corresponds to transmitting a first LTF signal at a first interval of time and sending a second LTF signal at a second interval of time). The same or different phase rotations may be applied to the two LTF signals. The phase rotations are specified in a 2×2 matrix (e.g., a 2×2 P-matrix as defined in IEEE 802.11). Alternatively, the flowchart 700 may be used to describe the decoding of the LTF signal for any number of transmit antennas (e.g., 3, 4, 5, 6, 7, 8, etc.).

At block 702, the example component interface 200 exchanges a masking protocol with the device that is transmitting the sounding signal (e.g., the AP 100 when the STA 102 is transmitting the sounding signal or the STA 102 when the AP 100 is transmitting the sounding signal). For example, the component interface 200 may receive the masking protocols from the transmitting device via the example radio architecture 103A, 103B. In some examples, the exchange occurs during initial negotiations. As further described in conjunction with FIG. 11, the masking protocol may be a masking sequence that is applied to (e.g., multiplied by) the sounding signal. Additionally or alternatively, the masking protocol may correspond to different LTF signals being generated by applying different LTF sequences in the frequency domain and converting the sequence into the time domain. In this manner, the receiving device can remove the LTF sequence by multiplying a conjugate sequence of the LTF sequence with the received signal in the frequency domain to decode the masked signal.

At block 704, the example component interface 200 obtains a first sounding signal (e.g., a first LTF signal) at a first signal interval. At block 706, the component interface 200 obtains a second sounding signal (e.g., a second LTF signal) at a second signal interval. For example, the component interface 200 receives the sounding signals from the transmitting device via the example radio architecture 103A, 103B. At block 708, the example signal decoder 214 decodes the first signal based on the first masking protocol. For example, if the first masking protocol corresponds to an LTF sequence that is applied to the LTF sequence in the frequency domain, the signal decoder 214 decodes the first signal by multiplying the conjugate sequence of the LTF sequence with the received signal in the frequency domain. At block 710, the example signal decoder 214 decodes the second signal based on the second masking protocol. At block 712, the example signal decoder 214 performs a P-Matrix decoding based on the decoded signals. For example, because the first signal includes a signal (e.g., A) transmitted on a first antenna and a signal (e.g., B) transmitted on a second antenna, the first signal may correspond to $S_1 = A+B$. In such an example, because the second signal includes a signal (e.g., A) transmitted on the first antenna and a phase rotated signal (e.g., −B, if the phase rotated by 180 degrees), then the second signal may correspond to $S_2 = A−B$. Accordingly, the signal decoder 214 may determine A and/or B by solving the system of equations.

Figure 8:
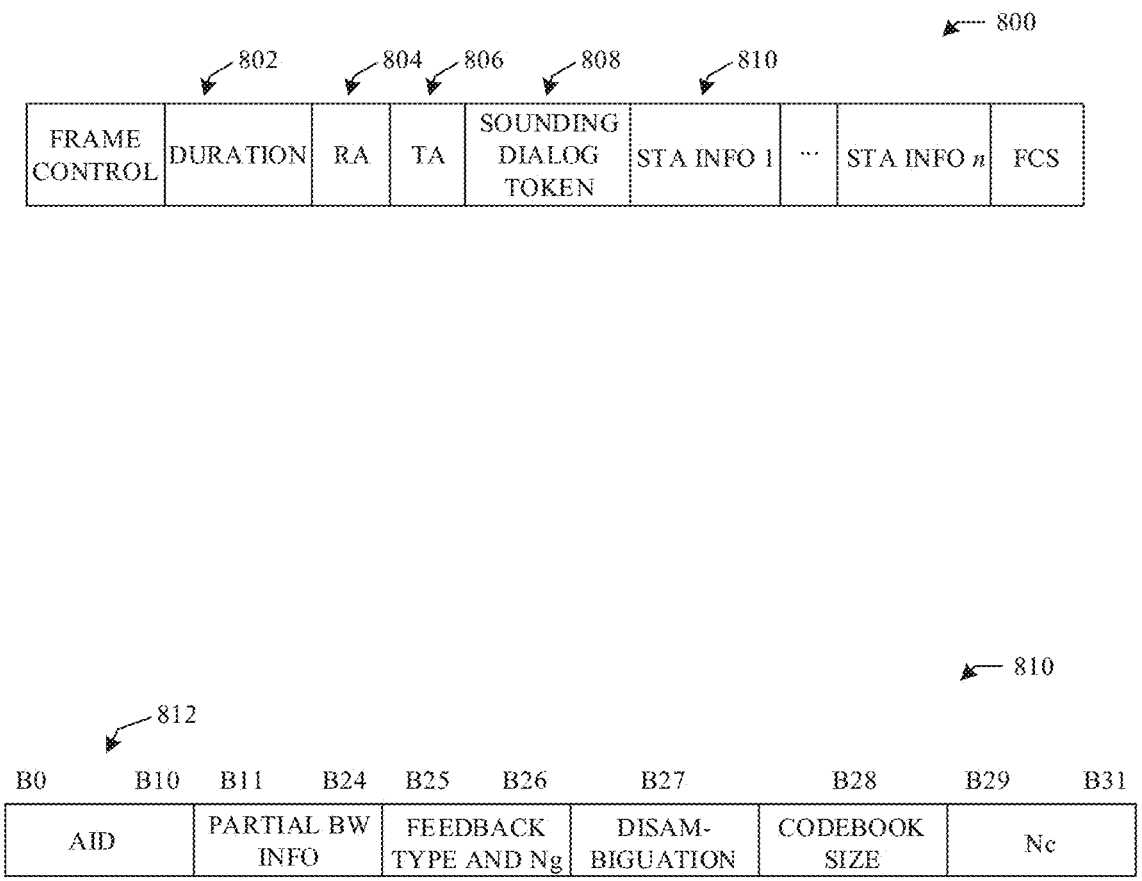
FIG. 8 illustrates an example null data packet announcement that may be generated by the second signal converter of FIGS. 1 and 2.

FIG. 8 illustrates an example NDPA packet 800 including random seed information that may be used to generate a secure sounding symbol for transmission between the example AP 100 and the example STA 102 of FIG. 2. The example NDPA packet 800 includes an example duration field 802, an example receiver address (RA) field 804, an example transmitter address (TA) field 806, an example sounding dialog token field 808, and an example STA information field 810. The example STA information field 810 includes an example association identifier (AID) field 812. The example NDPA packet 800 may include additional and/or less fields and/or the fields of the example NDPA packet 800 may be in a different order.

The example duration field 802 corresponds to the duration of transmit opportunity (TXOP) carrying the example NDPA packet 800. In this manner, a receiving device is aware of how long the TXOP is. The example RA field 804 includes a value corresponding to the MAC of the next immediate recipient of the frame. The example TA field 806 includes a value corresponding to the MAC of the system that is transmitting the frame. The example sounding dialog token field 808 includes a value representative of the sounding dialog token that may be used to match a response (e.g., from a beamforee) to a request (e.g., the beamformer's request). The example STA information field 810 corresponds to information to related to the first STA. If there are more STA's (e.g., for multi-user modes), the example NDPA packet 800 may include multiple STA information fields corresponding to the multiple STAs. The example STA information field 810 includes the example AID field 812 that includes value corresponding to the AID. The AID is used to identify the association between the example AP 100 and the example STA 102.

As described above, random seed information (e.g., a random seed and/or an identifier of a random seed) may be included in the example NDPA packet 800 to generate secure sounding signals. For example, for single-user mode, the RA field 804 corresponds to the MAC address of the receiver and the STA information field 810 corresponds to a single receiver of the NDPA 800. The AID field 812 is used to indicate the AID of the NDPA receiver (e.g., the PHY address). In some Wi-Fi protocols (e.g., 802.11az), there are about 16 reserved bits in the NDPA packet 800 that are not dedicated to a particular. In some examples, the 16 bits may be used for the random seed information. In some examples, the sounding dialog token field 808 may be extended from the current number of bits (e.g., 6 bits) to a larger number of bits (e.g., 22 bits) to form a random seed with about 22 bits. In some examples, the sounding dialog token for measurement report can still be six bits (e.g., as in 803.11mc) or it may be extended to about 22 bits.

In another example, for single-user mode, the RA field 804 corresponds to the MAC address of the receiver and the STA information field 810 corresponds to a single receiver of the NDPA 800. Accordingly, the AID field 812 may be repetitive because the receiver can be indicated by either the MAC address or the PHY address of the receiver. Accordingly, if the AID field 812 is not used to indicate the AID of the NDPA receiver, then the random seed information may be included in the example AID field 812. In some examples, by using the AID field 812 (e.g., 11 bits), the sounding dialog token (6 bits), and the reserved bits (16 bits), a 33 bit random seed may be included in the NDPA packet 800, thereby corresponding to $8 \times 10^9$ sounding signals.

In another example, useable bits to the STA information field 810 may be added to make it longer than the 4 bytes in IEEE 802.11ax (to be 6 or 8 bytes, for example) so that the STA information field 810 includes random seed information. In another example, in single-user mode, a second STA information field is not used (e.g., because only one STA is involved in a single-user mode). Accordingly, all or part of the random seed information may be included in the second STA information field during single-user mode. In another example, a new frame type or subtype may be defined to expand the example NDPA packet 800 for accommodating the random seed information. In another example, a new frame type may be added to another frame to accommodate the random seed information. For example, the random seed information may be included in a trigger frame.

For devices with multiple antennas used in ranging or positioning, multiple sounding symbols are used. Different randomized sounding signals may be used for different sounding symbols such that the sounding symbol does not repeat in time. Using a common key, the sounding dialog token, and the random seed, the transmitter and the receiver can generate multiple different, randomized sounding signals and sequentially assign the sounding signals during a sounding protocol, respectively. For single-user mode, the NDPA frame right before the two NDP sounding frames may indicate the number of the sounding symbols in each NDP frame so that the receiver of the NDPA can generate the randomized sounding signal in advance. The number of sounding symbols usually corresponds to the number of transmit antennas sounding the channel. Similarly, for a multi-user mode, the trigger frame before the first set of NDP transmission and/or the NDPA before the second set of NDP transmission can indicate the token, the transom seed, and the number of sounding symbols.

For multi-user mode, a trigger frame may be used before the first set of NDP transmissions instead of an NDPA. The common key may be obtained during the negotiation or association phase. In such examples, the sounding dialog token and/or the random seed information may be added to the trigger frame. The dialog token may be added to a common information field of the trigger frame because the users sharing the same multi-user sounding may share the same sounding dialog token. The random seed information can be added to the common information field of the trigger frame and shared by the users sharing the same multi-user (MU) sounding. Alternatively, individual random seed information can be added to each of the user's user information field of a trigger frame. If security protection is not needed for multi-user mode, then the sounding token may be added to the trigger frame (e.g., and the random seed information may be omitted) so that the measurement report can refer to the corresponding measurement.

Figure 9:
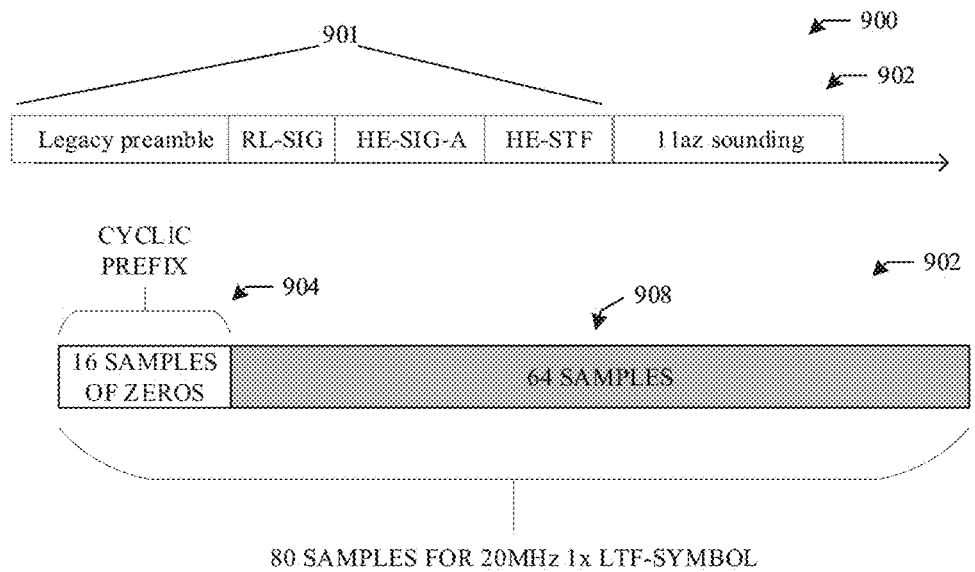
FIG. 9 illustrates an example sounding signal that may be generated by the second signal converter of FIGS. 1 and 2.

FIG. 9 illustrates an example sounding symbol packet 900. The sounding symbol packet 900 includes an example preamble 901 and an example sounding signal frame 902. The example sounding signal frame 902 includes an example initial CP 904. Alternatively, any type of sounding signal may be used. The example preamble 901 includes a legacy preamble, a repeated legacy signal field (RL-SIG), a (HE-SIG-A), and a high efficiency-short training field (HE-STF). In some examples, the preamble 901 may include additional, fewer and/or different fields.

The example sounding signal frame 902 of FIG. 9 includes multiple signals based on tones in the frequency domain. As illustrated in the example of FIG. 9, the example sounding signal frame 902 includes the initial CP 904 that may be repeated at the end of the sounding signal frame 902 (e.g., a final CP). The CP 904 is a zero-energy CP (e.g., a zero energy guard), so that even if the attacker 106 measures the CP 904, outputting a time-shifter fake tap corresponding the CP 904 will not cause an error because doing so corresponds to not outputting any energy. The example CP 904 corresponds to 16 samples of zero energy and the example LTF symbol 908 is a 1×LTF symbol (e.g., 1×LTF symbol duration of 3.2 microseconds) corresponding to 80 samples for 20 Megahertz (MHz). In the illustrated example of FIG. 9, the example LTF signal 908 is followed by a short interframe space (SIFS) period. Because there is no transmission during the SIFS period, the zero energy of the SIFS period can identify the end of the LTF sounding signal 908 to a receiving device. However, if the sounding field 902 corresponds to a sounding with two repetitions (e.g., 6.4 microseconds), the example CP 904 may be repeated after the example LTF signal 908. Additionally or alternatively, the LTF signal may correspond to other durations (e.g., 12.8 microseconds). The second CP, after the LTF signal 908, may include the same number or a different number of samples as the CP 904. The example CP 904 may be 0.8 microseconds, 1.6 microseconds, and/or any other duration of tie.

Figure 10:
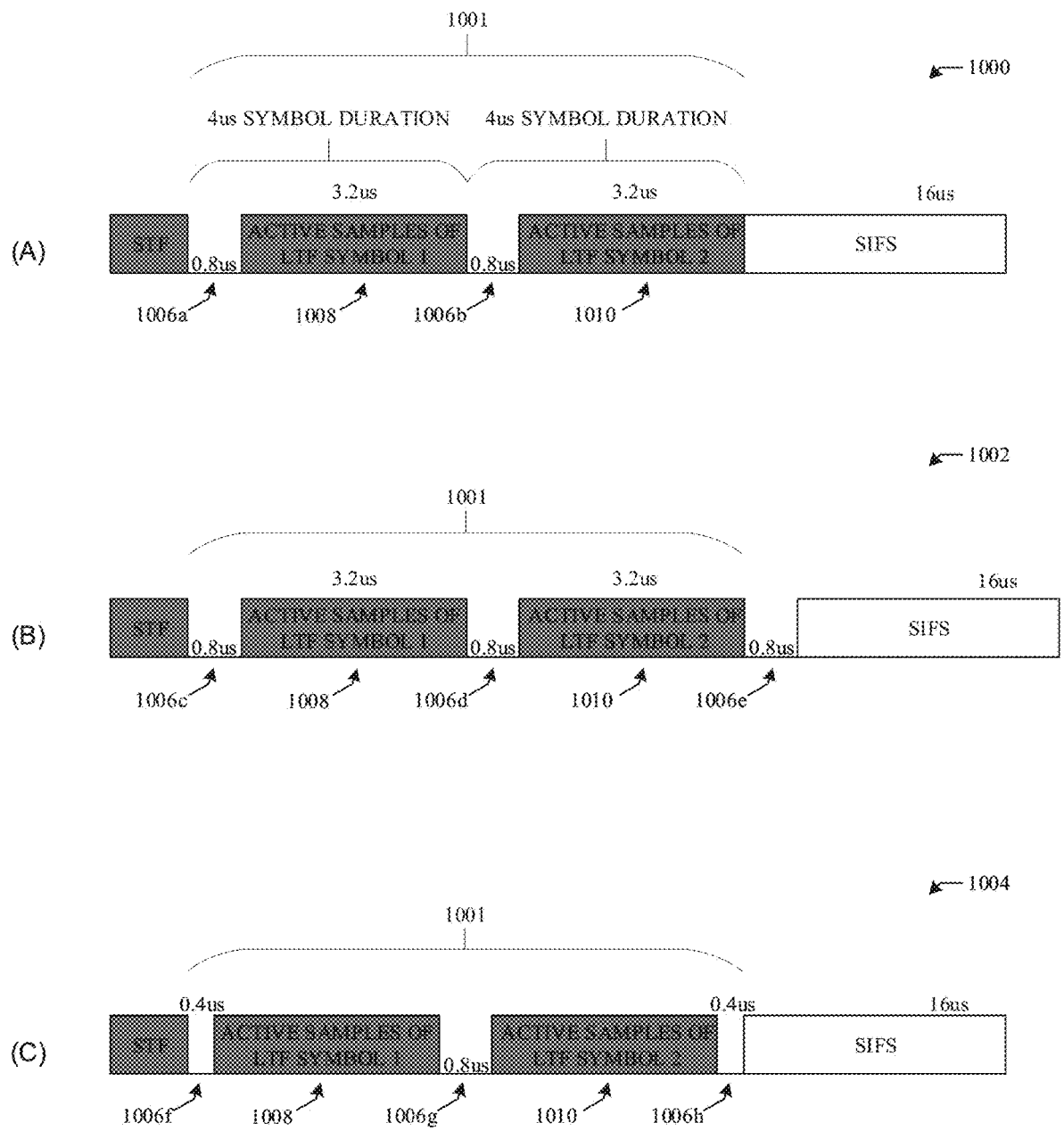
FIG. 10 illustrates example sounding signals with zero guard energies that may be generated by the second signal converter of FIGS. 1 and 2.

FIG. 10 illustrates example timing diagrams 1000, 1002, 1004 corresponding to an example secure sounding symbol 1001 (e.g., a sounding signal with two repetitions 1008, 1010) with zero energy guards (e.g., CPs) 1006a-h that may be generated by the example secure signal converters 104A, 104B of FIG. 1. Some sounding symbols (e.g., used in IEEE 802.1 lax protocol) with a 1× symbol duration includes a 0.8 microsecond (us) CP and a 3.2 us sounding symbol (e.g., corresponding to $2^n$ number of time domain samples). The 3.2 microsecond sounding symbol corresponds to the 1× symbol duration of IEEE 802.11ax. Similarly, the sounding symbol of the secure sounding symbols 1008 and 1010 may correspond to a 2× duration symbol duration i.e. 6.4 microseconds instead of 3.2 microseconds. The zero energy CP may be also 0.8 microseconds or 1.6 microseconds. Alternatively, the sounding symbol of the secure sounding symbols 1001 may correspond to a 1× duration symbol duration. The 3.2 microsecond sounding symbol is generated by same the fast Fourier transform (FFT) or inverse (IFFT) used for the conventional sounding symbol. For some sounding symbols, the last 0.8 microsecond of the 3.2 microsecond sounding signal is added to the beginning as the cyclic prefix. Additionally, the initial zero energy guards 1006a, 1006c, 1006f prevent multipath interference from the STF signal of the preamble. In some examples, the final zero guard energies 1006e, 1006h are added prior to the SIFS duration to accommodate multipaths from the last LTF symbol. The zero energy guard may correspond to different durations of time. For example, in FIG. 10, the zero guard energies 1006a-e, 1006g correspond to 0.8 microseconds (16 samples for 20 M Hz sounding, 64 samples for 80 MHz, etc.) while the zero guard energies 1006f, 1006h corresponds to 0.4 microseconds (8 samples for 20 MHz sounding, 32 samples for 80 MHz, etc.).

Figure 11:
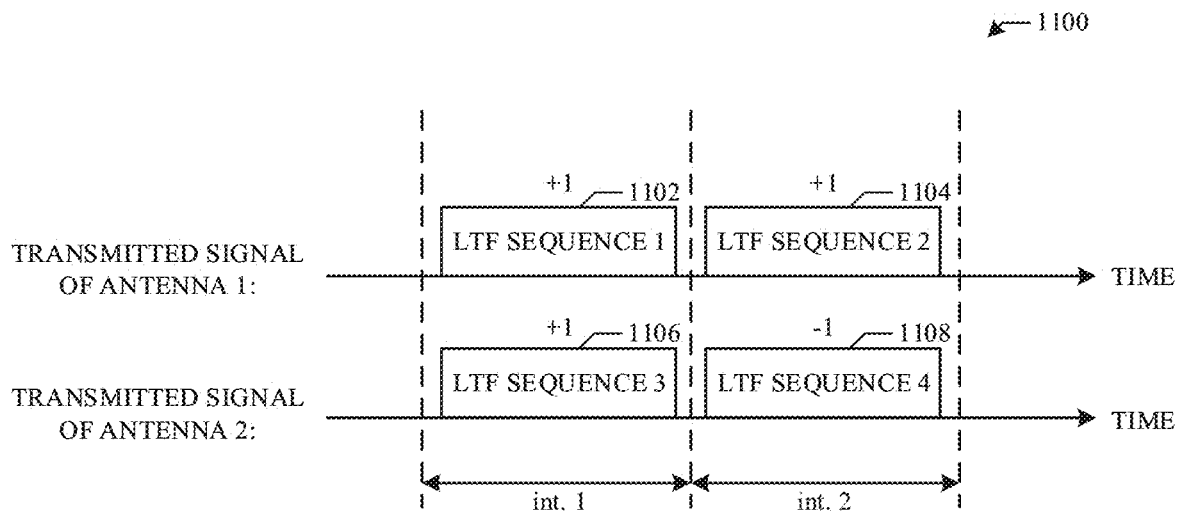
FIG. 11 illustrates an example timing diagram of a multi-antenna sounding protocol.
Figure 11:
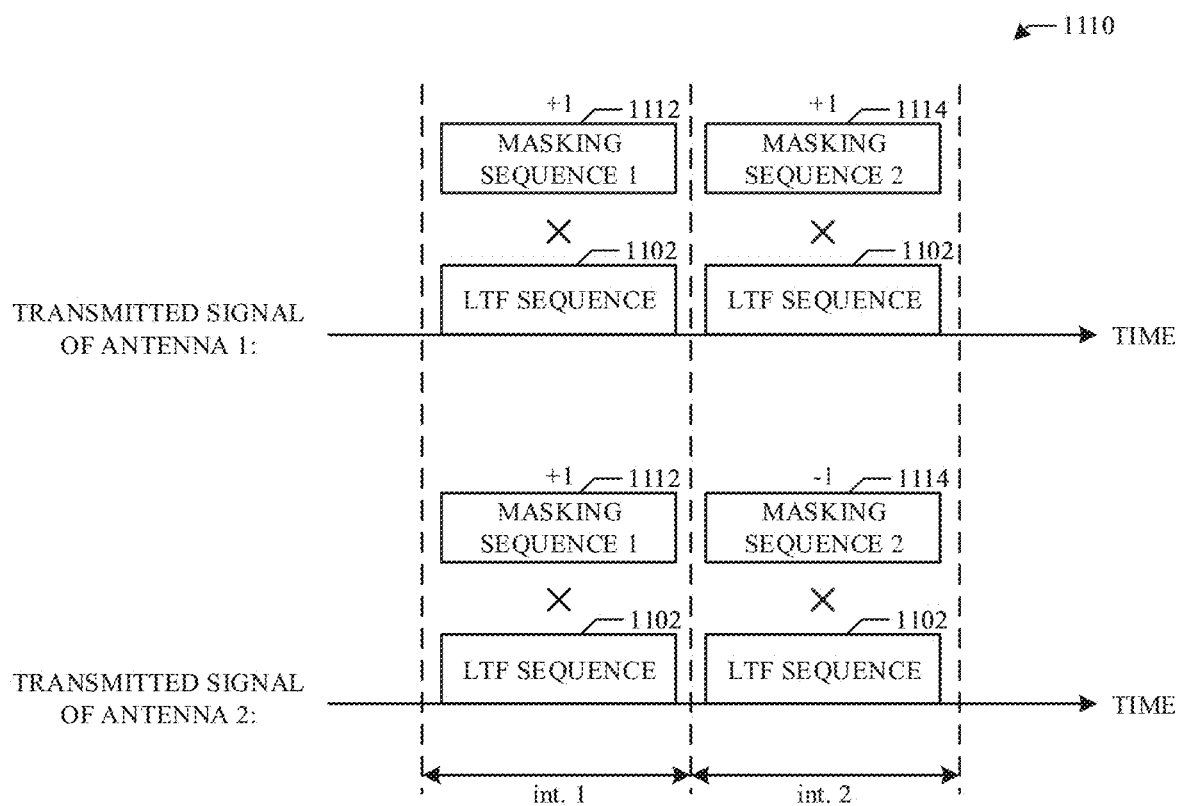

FIG. 11 illustrates example timing diagrams 1100, 1110 corresponding to a masking protocol for generating a secure sounding signal for multiple antennas (e.g., two antennas) corresponding to an LTF sounding signal transmitted at a first and second signal intervals. The example timing diagrams 1100, 1110 include example LTF sequences 1102, 1104, 1106, 1108 and example masking sequences 1112, 1114. Although the timing diagrams 1100, 1110 correspond to a two antenna transmission, any number of antennas may be used to transmit LTF sequences for a sounding protocol.

The first example timing diagram 1100 of FIG. 11 illustrates a masking protocol used for sounding with multiple antennas. For example, at the first signal interval, the transmitting device transmits the example LTF sequences 1102 on the first antenna and the example LTF sequence 1106 on the second antenna. The LTF sequences 1102, 1106 are generated by applying a first sequence to sounding symbols in the frequency domain and converting the sequence to the time domain. Both the LTF sequences 1102, 1106 may be phase modulated/shifted (e.g., corresponding to the +1) in the same way or differently. At the second signal interval, the transmitting device transmits the example LTF sequence 1104 on the first antenna and the example LTF sequence 1108 on the second antenna. The LTF sequences 1104, 1108 are generated by apply a second sequence, different from the first sequence, to sounding symbols in the frequency domain and converting the sequence to the time domain. Both the LTF sequences 1104, 1108 may be phase modulated/shifted (e.g., corresponding to the +1) in a way different from the one applied to 1102 and 1106 in the first signal interval. In this manner, the signals transmitted at the first time interval and the second timer interval may correspond to the same sounding symbols (e.g. with all ones or zeros) but may be sequenced differently. The receiving device decodes the LTF sequences to identify the LTF symbols by multiplying the conjugate sequence of the LTF sequence with the received signal in the frequency domain. In the example in FIG. 11, the LTF sequence 1104 is not phase modulated/shifted (e.g., corresponding to the +1), while the LTF sequence 1108 is phased modulated/shifter by 180 degrees (e.g., corresponding to the −1). In this manner, the receiving device can perform a P-matrix decoding to identify the channels from each transmit antenna to the receive antenna, respectively.

The first example timing diagram 1110 of FIG. 11 illustrates a masking protocol used for sounding with multiple antennas. For example, at the first signal interval, the transmitting device (a) combines (e.g., multiplies) the example masking sequence 1112 with the example LTF sequences 1102 and outputs the result on the first antenna and the second antenna. Both the signals output by the antennas at the first signal interval may be phase modulated/shifted (e.g., corresponding to the +1) in the same or different ways. At the second signal interval, the transmitting device (a) combines (e.g., multiplies) the example masking sequence 1114 with the example LTF sequences 1102 and outputs the result on the first antenna and the second antenna. In this manner, the signals transmitted at the first time interval and the second timer interval may correspond to the same sounding symbols (e.g. the LTF sequences 1102) but may be masked differently. Both the signals output by the antennas at the second signal interval may be phase modulated/shifted (e.g., corresponding to the +1) in a way different from the one applied in the first signal interval. The receiving device decodes the LTF sequences to identify the LTF symbols/sequence based on the masking sequences 1112, 1114. In the example in FIG. 11, the signal transmitted by the first antenna at the second interval is not phase modulated/shifted (e.g., corresponding to the +1), while the signal transmitted by the second antenna at the second interval is phased modulated/shifter by 180 degrees (e.g., corresponding to the −1). In this manner, the receiving device can perform a P-matrix decoding to identify the channels from each transmit antenna to the receive antenna, respectively.

FIG. 12 is a block diagram of a radio architecture 103A, 103B in accordance with some embodiments that may be implemented in any one of the example AP 100 and/or the example STA 102 of FIG. 1. Radio architecture 103A, 103B may include radio front-end module (FEM) circuitry 1204a-b, radio IC circuitry 1206a-b and baseband processing circuitry 1208a-b. Radio architecture 103A, 103B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 1208a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a link aggregator for generation and processing of the baseband signals and for controlling operations of the radio IC circuitry 1206a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204a and the BT FEM circuitry 1204b, embodiments include within their scope the sharing of one or more antennas as between the WLAN and BT FEMs, or the provision of more than one antenna connected to each of FEM 1204a or 1204b.

In some embodiments, the front-end module circuitry 1204a-b, the radio IC circuitry 1206a-b, and baseband processing circuitry 1208a-b may be provided on a single radio card, such as wireless radio card 1202. In some other embodiments, the one or more antennas 1201, the FEM circuitry 1204a-b and the radio IC circuitry 1206a-b may be provided on a single radio card. In some other embodiments, the radio IC circuitry 1206a-b and the baseband processing circuitry 1208a-b may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 103A, 103B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 103A, 103B may be part of a Wi-Fi communication station (STA) such as a wireless access point (AP), a base station or a mobile device including a Wi-Fi device. In some of these embodiments, radio architecture 103A, 103B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 103A, 103B may also be suitable to transmit and/or receive communications in accordance with other techniques and standards.

In some embodiments, the radio architecture 103A, 103B may be configured for high-efficiency Wi-Fi (HEW) communications in accordance with the IEEE 802.1 lax standard. In these embodiments, the radio architecture 103A, 103B may be configured to communicate in accordance with an OFDMA technique, although the scope of the embodiments is not limited in this respect.

In some other embodiments, the radio architecture 103A, 103B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Figure 15:
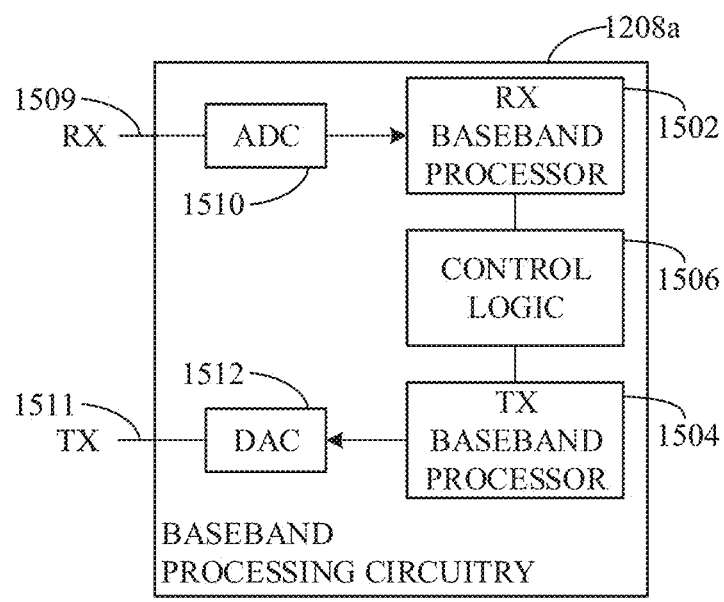
FIG. 15 illustrates an example baseband processing circuitry for use in the radio architecture of FIG. 12 in accordance with some examples.

In some embodiments, as further shown in FIG. 15, the BT baseband circuitry 1208b may be compliant with a Bluetooth (BT) connectivity standard such as Bluetooth, Bluetooth 8.0 or Bluetooth 6.0, or any other iteration of the Bluetooth Standard. In In some embodiments, the radio architecture 103A, 103B may include other radio cards, such as a cellular radio card configured for cellular (e.g., 3GPP such as LTE, LTE-Advanced or 5G communications).

In some IEEE 802.11 embodiments, the radio architecture 103A, 103B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
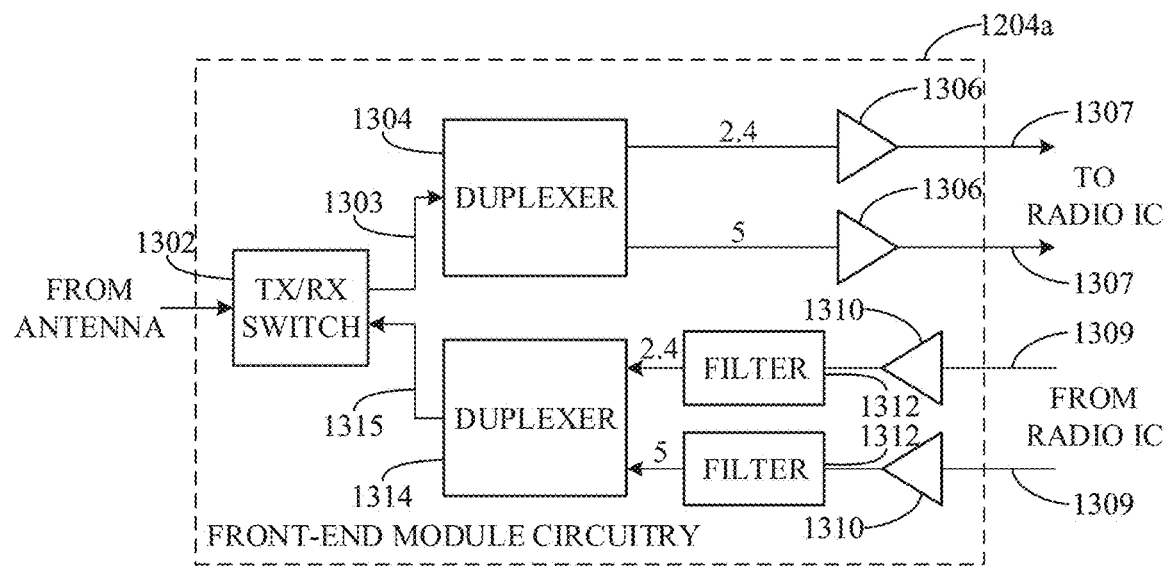
FIG. 13 illustrates an example front-end module circuitry for use in the radio architecture of FIG. 12 in accordance with some examples.

FIG. 13 illustrates WLAN FEM circuitry 1204a in accordance with some embodiments. Although the example of FIG. 13 is described in conjunction with the WLAN FEM circuitry 1204a, the example of FIG. 13 may be described in conjunction with the example BT FEM circuitry 1204b (FIG. 12), although other circuitry configurations may also be suitable.

In some embodiments, the FEM circuitry 1204a may include a TX/RX switch 1302 to switch between transmit mode and receive mode operation. The FEM circuitry 1204a may include a receive signal path and a transmit signal path. The receive signal path of the FEM circuitry 1204a may include a low-noise amplifier (LNA) 1306 to amplify received RF signals 1303 and provide the amplified received RF signals 1307 as an output (e.g., to the radio IC circuitry 1206a-b (FIG. 12)). The transmit signal path of the circuitry 1204a may include a power amplifier (PA) to amplify input RF signals 1309 (e.g., provided by the radio IC circuitry 1206a-b), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204a may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1404a as the one used for WLAN communications.

Figure 14:
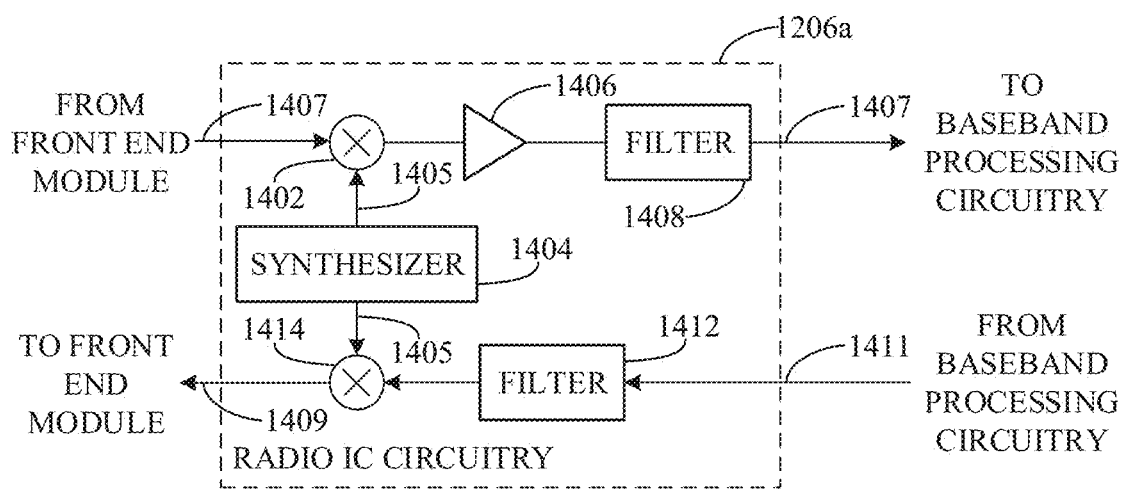
FIG. 14 illustrates an example radio IC circuitry for use in the radio architecture of FIG. 12 in accordance with some examples.

FIG. 14 illustrates radio IC circuitry 1206a in accordance with some embodiments. The radio IC circuitry 1206a is one example of circuitry that may be suitable for use as the WLAN or BT radio IC circuitry 1206a/1406b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, up-conversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1407 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1409 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or up-conversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct up-conversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1407 from FIG. 14 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 14) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208a-b (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210. The application processor 1210 may include, or otherwise be connected to, one of the example secure signal converters 104A, 104B (e.g., depending on which device the example radio architecture is implemented in).

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency (fLO).

FIG. 15 illustrates a functional block diagram of baseband processing circuitry 1208*a* in accordance with some embodiments. The baseband processing circuitry 1208*a* is one example of circuitry that may be suitable for use as the baseband processing circuitry 1208*a* (FIG. 12), although other circuitry configurations may also be suitable. Alternatively, the example of FIG. 143 may be used to implement the example BT baseband processing circuitry 1208*b* of FIG. 12.

The baseband processing circuitry 1208*a* may include a receive baseband processor (RX BBP) 1502 for processing receive baseband signals 1409 provided by the radio IC circuitry 1206*a-b* (FIG. 12) and a transmit baseband processor (TX BBP) 1504 for generating transmit baseband signals 1411 for the radio IC circuitry 1206*a-b*. The baseband processing circuitry 1208*a* may also include control logic 1506 for coordinating the operations of the baseband processing circuitry 1208*a*.

In some embodiments (e.g., when analog baseband signals are exchanged between the baseband processing circuitry 1208*a-b* and the radio IC circuitry 1206*a-b*), the baseband processing circuitry 1208*a* may include ADC 1510 to convert analog baseband signals 1509 received from the radio IC circuitry 1206*a-b* to digital baseband signals for processing by the RX BBP 1502. In these embodiments, the baseband processing circuitry 1208*a* may also include DAC 1512 to convert digital baseband signals from the TX BBP 1504 to analog baseband signals 1511.

In some embodiments that communicate OFDM signals or OFDMA signals, such as through baseband processor 1208*a*, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 103A, 103B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 16:
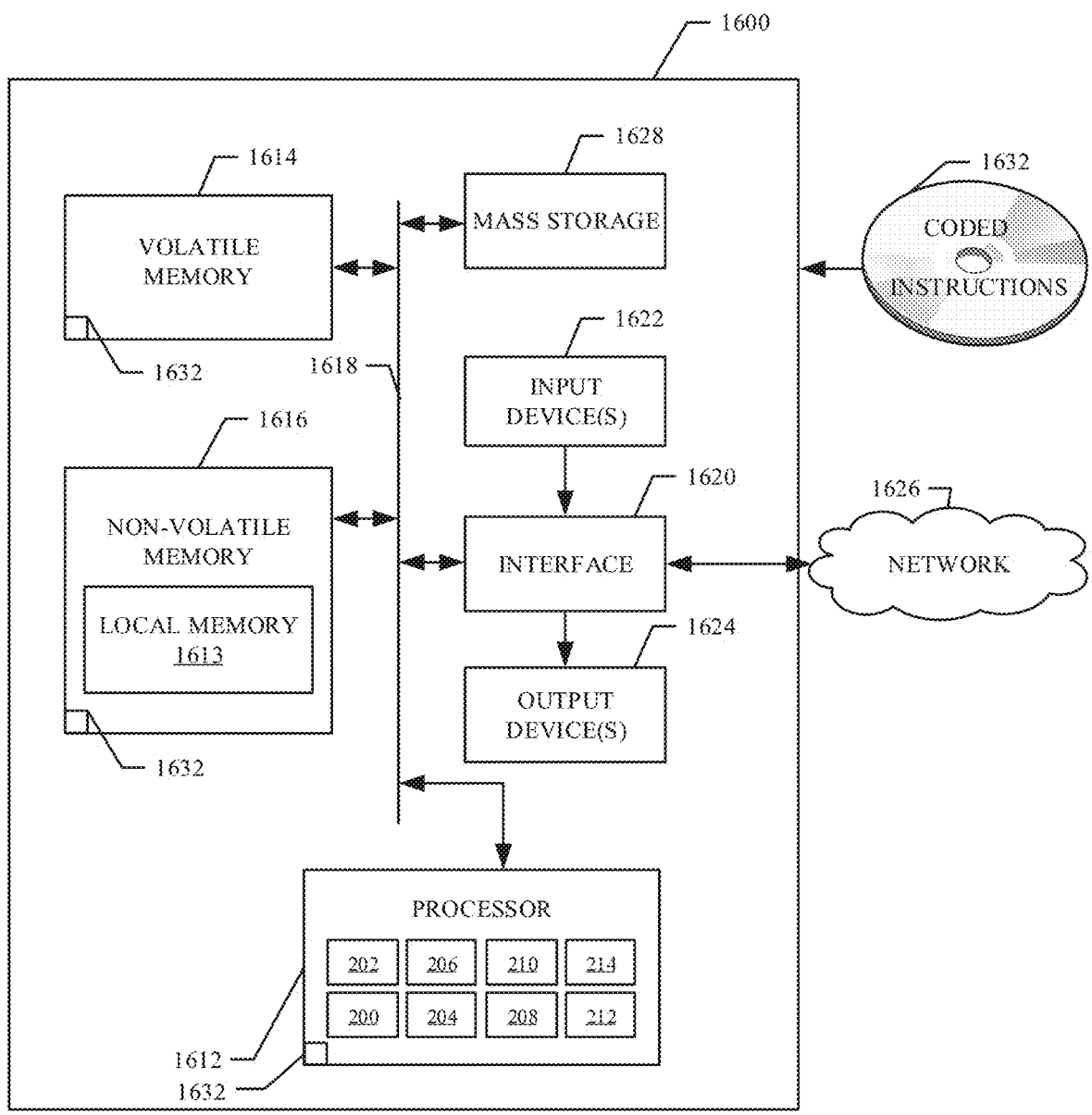
FIG. 16 is a block diagram of a processor platform structured to execute the example machine readable instructions of FIGS. 3-7 to implement the example secure signal converter of FIGS. 1 and 2.

FIG. 16 is a block diagram of an example processor platform 1600 capable of executing the instructions of FIGS. 3-7 to implement the example secure signal converters 104A, 104B of FIGS. 1 and/or 2. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 200, the example frame generator 202, the example frame processor 204, the example cipher 206, the example decipher 208, the example timer 210, the example signal generator/masker 212, and the example signal decoder 214.

The processor 1612 of the illustrated example includes a local memory 1613 (e.g., a cache). The example processor 1612 of FIG. 16 executes the instructions of FIGS. 3-7 to implement the example sounding signal converter 104A, 104B and the example component interface 200 of FIG. 2. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a clock controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 3-7 may be stored in the mass storage device 1628, in the volatile memory 1614, in the non-volatile memory 1616, and/or on a removable tangible computer readable storage medium such as a CD or DVD.

Example 1 includes an apparatus to secure a sounding signal, the apparatus comprising a cipher to generate a bit value based on a common key and a seed value, a frame generator to generate a sounding signal based on the bit value, and an interface to instruct radio architecture to transmit the sounding signal.

Example 2 includes the apparatus of example 1, wherein the interface obtains the common key during initial negotiations with a station.

Example 3 includes the apparatus of example 2, wherein the interface instructs the radio architecture to transmit the common key during the initial negotiations with the station.

Example 4 includes the apparatus of example 1, wherein the interface transmits seed information corresponding to the seed value in at least one of a null data packet announcement, a location measurement report, or a trigger frame.

Example 5 includes the apparatus of example 1, wherein a station is to decipher the sounding signal based on the seed value example 6 includes the apparatus of example 1, wherein the interface obtains seed information corresponding to the seed value from a station.

Example 7 includes the apparatus of example 1, further including a processor to update the seed value after the interface instructs the radio architecture to transmit the sounding signal.

Example 8 includes the apparatus of example 7, wherein the interface is to instruct the radio architecture to transmit the updated seed value to a station.

Example 9 includes the apparatus of example 7, wherein the interface receives the updated seed information corresponding to the updated seed value from a station.

Example 10 includes the apparatus of example 1, wherein the sounding signal is a first sounding signal, and the seed value is a first seed value, wherein the frame generator is to generate the first sounding signal responsive to the interface obtaining a second sounding signal, the second sounding signal corresponding to at least one of the common key or a second seed value, the first sounding signal being a response to the second sounding signal.

Example 11 includes the apparatus of example 10, further including a decipher to decipher the second sounding signal based on at the least one of the second sounding signal or the second seed value.

Example 12 includes the apparatus of example 1, wherein the frame generator is to include a zero energy guard in the sounding signal as a prefix for the signal.

Example 13 includes the apparatus of example 12, wherein the zero energy guard has a duration of at least one of example 0 includes 8 microseconds or example 1 includes 6 microseconds.

Example 14 includes the apparatus of example 1, further including a signal generator to generate the sounding signal with a first sequence in a frequency domain, and update the first sequence to a second sequence for a subsequent sounding signal.

Example 15 includes the apparatus of example 14, wherein the interface is to transmit the first sequence to a station, the station to decode the sounding signal based on the first sequence.

Example 16 includes the apparatus of example 1, wherein the sounding signal has a duration of example 6 includes 4 microseconds.

Example 17 includes a non-transistor computer readable storage medium comprising instructions which, when executed, cause a machine to at least generate a bit value based on a common key and a seed value, generate a sounding signal based on the bit value, and instruct radio architecture to transmit the sounding signal.

Example 18 includes the computer readable storage medium of example 17, wherein the instructions when executed cause the machine to at least obtain the common key during initial negotiations with a station.

Example 19 includes a method to secure a sounding signal, the method comprising generating a bit value based on a common key and a seed value, generating a sounding signal based on the bit value, and instructing radio architecture to transmit the sounding signal.

Example 20 includes the method of example 19, further including transmitting seed information corresponding to the seed value in at least one of a null data packet announcement, a location measurement report, or a trigger frame.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to secure a sounding signal, the apparatus comprising:
    a cipher to generate a bit value based on a common key and random seed information, the random seed information including a seed value;
    a frame generator to generate a sounding signal based on the bit value;
    an interface to instruct radio architecture to transmit the sounding signal to a first device; and
    a decipher to determine that a response to the sounding signal is from a second device different than the first device, the determination made using the random seed information.

2. The apparatus of claim 1, wherein the interface obtains the common key during initial negotiations with a station.

3. The apparatus of claim 2, wherein the interface instructs the radio architecture to transmit the common key during the initial negotiations with the station.

4. The apparatus of claim 1, wherein the interface transmits seed information corresponding to the seed value in at least one of a null data packet announcement, a location measurement report, or a trigger frame.

5. The apparatus of claim 1, wherein a station is to decipher the sounding signal based on the seed value.

6. The apparatus of claim 1, wherein the interface obtains seed information corresponding to the seed value from a station.

7. The apparatus of claim 1, further including a processor to update the seed value after the interface instructs the radio architecture to transmit the sounding signal.

8. The apparatus of claim 7, wherein the interface is to instruct the radio architecture to transmit the updated seed value to a station.

9. The apparatus of claim 7, wherein the interface receives the updated seed information corresponding to the updated seed value from a station.

10. The apparatus of claim 1, wherein the sounding signal is a first sounding signal, and the seed value is a first seed value, wherein the frame generator is to generate the first sounding signal responsive to the interface obtaining a second sounding signal, the second sounding signal corresponding to at least one of the common key or a second seed value, the first sounding signal being a response to the second sounding signal.

11. The apparatus of claim 10, wherein the decipher is to decipher the second sounding signal based on at the least one of the second sounding signal or the second seed value.

12. The apparatus of claim 1, wherein the frame generator is to include a zero energy guard in the sounding signal as a prefix for the sounding signal.

13. The apparatus of claim 12, wherein the zero energy guard has a duration of at least one of 0.8 microseconds or 1.6 microseconds.

14. The apparatus of claim 1, further including a signal generator to:
   generate the sounding signal with a first sequence in a frequency domain; and
   update the first sequence to a second sequence for a subsequent sounding signal.

15. The apparatus of claim 14, wherein the interface is to transmit the first sequence to a station, the station to decode the sounding signal based on the first sequence.

16. The apparatus of claim 1, wherein the sounding signal has a duration of 6.4 microseconds.

17. A non transitory computer readable storage medium comprising instructions which, when executed, cause a machine to at least:
   generate a bit value based on a common key and random seed information, the random seed information including a seed value;
   generate a sounding signal based on the bit value;
   instruct radio architecture to transmit the sounding signal to a first device; and
   determine that a response to the sounding signal is from a second device different than the first device, the determination made based on the random seed information.

18. The computer readable storage medium of claim 17, wherein the instructions when executed cause the machine to at least obtain the common key during initial negotiations with a station.

19. A method to secure a sounding signal, the method comprising:
   generating, by executing an instruction with a processor, a bit value based on a common key and random seed information including a seed value;
   generating, by executing an instruction with the processor, a sounding signal based on the bit value; and
   instructing radio architecture to transmit the sounding signal to a first device; and
   determining, by executing an instruction with the processor, that a response to the sounding signal is from a second device different than the first device.

20. The method of claim 19, further including transmitting seed information corresponding to the seed value in at least one of a null data packet announcement, a location measurement report, or a trigger frame.

* * * * *